United States Patent
Viger et al.

(10) Patent No.: US 9,106,444 B2
(45) Date of Patent: Aug. 11, 2015

(54) METHOD FOR TRANSMITTING OF A MULTI-CHANNEL DATA STREAM ON A MULTI-TRANSPORT TUNNEL, CORRESPONDING COMPUTER-READABLE STORAGE MEANS AND TUNNEL END-POINTS

(75) Inventors: Pascal Viger, Janze (FR); Stéphane Baron, Le Rheu (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 1423 days.

(21) Appl. No.: 12/636,680

(22) Filed: Dec. 11, 2009

(65) Prior Publication Data
US 2010/0161824 A1    Jun. 24, 2010

(30) Foreign Application Priority Data
Dec. 12, 2008   (FR) .................................. 08 58552

(51) Int. Cl.
G06F 15/16    (2006.01)
H04L 12/46    (2006.01)
H04L 12/28    (2006.01)

(52) U.S. Cl.
CPC ........ *H04L 12/4633* (2013.01); *H04L 12/2832* (2013.01)

(58) Field of Classification Search
USPC ........... 709/231, 238, 212; 370/230, 474, 352
See application file for complete search history.

(56) References Cited

U.S. PATENT DOCUMENTS

| | | | | |
|---|---|---|---|---|
| 5,557,724 A * | 9/1996 | Sampat et al. | ................... | 725/43 |
| 7,136,377 B1 * | 11/2006 | Tweedly et al. | ................ | 370/356 |
| 7,149,678 B2 * | 12/2006 | Gurevich et al. | ................ | 703/22 |
| 7,395,349 B1 * | 7/2008 | Szabo et al. | ................... | 709/238 |
| 7,396,993 B2 * | 7/2008 | Tada | ................................ | 84/645 |
| 7,522,581 B2 * | 4/2009 | Acharya et al. | ................ | 370/352 |
| 7,577,123 B2 * | 8/2009 | Hashimoto et al. | ........... | 370/338 |
| 7,702,809 B1 * | 4/2010 | Szabo et al. | ................... | 709/238 |
| 7,742,417 B2 * | 6/2010 | Gilfix et al. | ................... | 370/235 |
| 7,843,968 B2 * | 11/2010 | Okamoto et al. | ............. | 370/474 |
| 7,957,278 B2 * | 6/2011 | Park | .............................. | 370/230 |

(Continued)

FOREIGN PATENT DOCUMENTS

| JP | 2000-181827 | 6/2000 |
|---|---|---|
| JP | 2008-124645 | 5/2008 |

OTHER PUBLICATIONS

French Search Report dated Jun. 30, 2009 issued during prosecution of related French application No. 0858552.

*Primary Examiner* — Tammy Nguyen
(74) *Attorney, Agent, or Firm* — Fitzpatrick, Cella, Harper & Scinto

(57) ABSTRACT

A method is proposed for transmitting a multi-channel data stream comprising frames comprising a plurality of channels, the transmitting being done through a multi-transport tunnel from a first tunnel end-point to a second tunnel end-point, the multi-transport tunnel implementing a first carrier supporting a transport protocol with acknowledgement and a second carrier supporting a transport protocol without acknowledgement.

The invention aims more specifically at averting or limiting the phenomena of interruptions in the rendering of a multi-channel stream in transit on a tunnel, and more particularly at providing a transport technique enabling regular and uninterrupted delivery of the multi-channel stream while at the same time reducing the memory resources needed at reception.

13 Claims, 10 Drawing Sheets

(56) References Cited

U.S. PATENT DOCUMENTS

| | | | |
|---|---|---|---|
| 8,005,916 B2 * | 8/2011 | Pope et al. | 709/212 |
| 8,612,536 B2 * | 12/2013 | Pope et al. | 709/212 |
| 2003/0028648 A1 * | 2/2003 | Calhoun | 709/227 |
| 2007/0247395 A1 * | 10/2007 | Barraclough et al. | 345/51 |

* cited by examiner

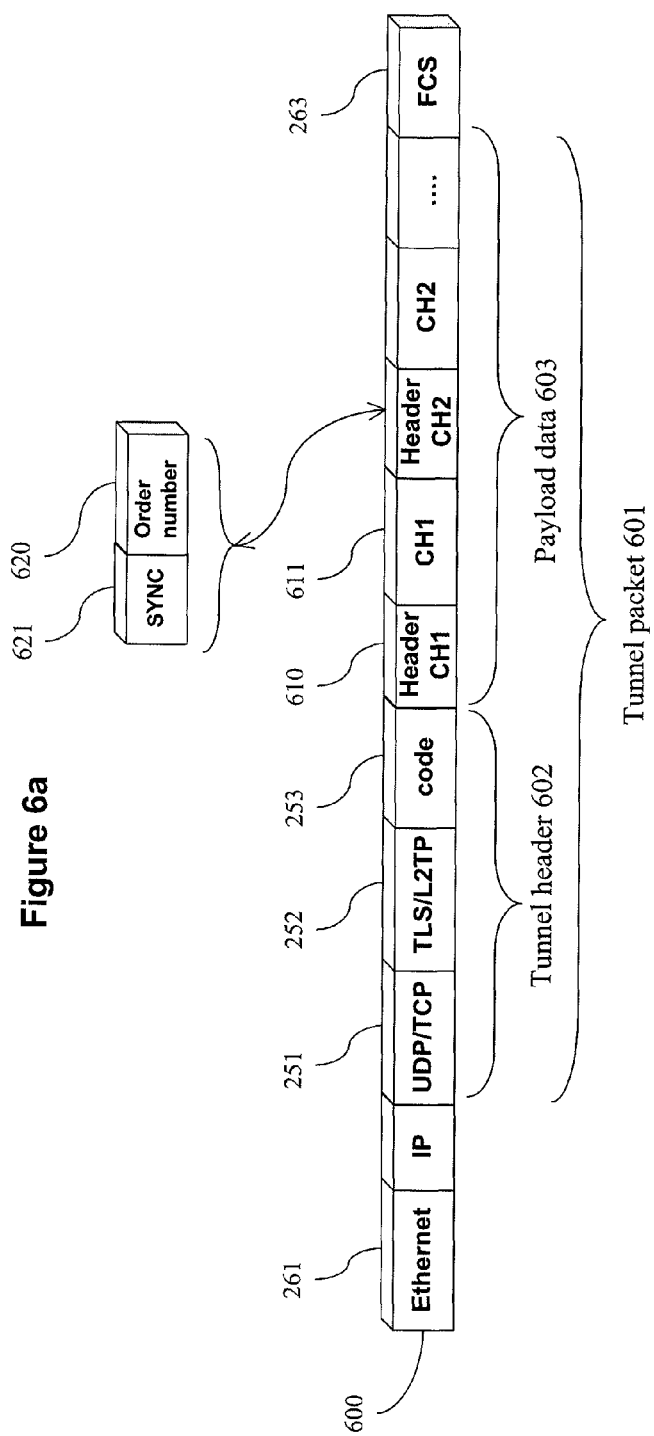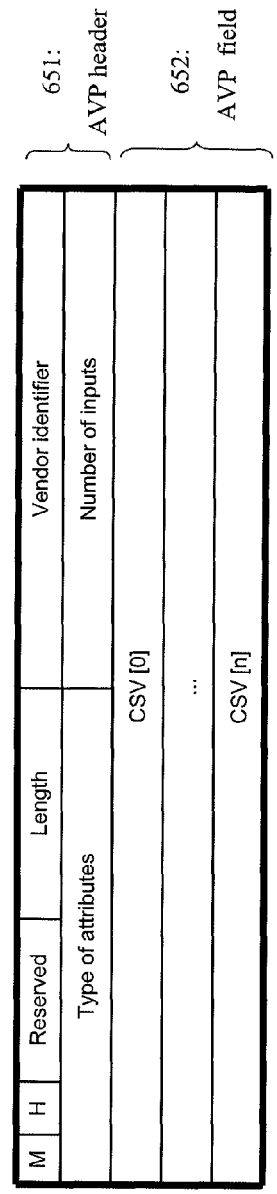
Figure 6a
Figure 6b

METHOD FOR TRANSMITTING OF A MULTI-CHANNEL DATA STREAM ON A MULTI-TRANSPORT TUNNEL, CORRESPONDING COMPUTER-READABLE STORAGE MEANS AND TUNNEL END-POINTS

1. FIELD OF THE DISCLOSURE

The field of the invention is that of communications networks.

More specifically, the invention pertains to a technique for transmitting data packets (also called datagrams) on a tunnel going through a communications network.

The democratization of high-bit-rate Internet on the one hand and the appearance of general consumer audiovisual equipment having network connectivity on the other hand are going to create new forms of behavior on the part of users. These new forms of behavior will undoubtedly involve the appearance of individuals belonging to groups of persons having common interests (leisure, family, etc) that we might call "permanently linked" groups. These groups will set up almost permanent connections with other individuals of a same field of interest, setting up audio and/or video communications and sharing all kinds of information (audio, video, photo, text etc).

The technology of Virtual Private Networks (VPN) is offering a worthwhile solution to this expectation. VPN enables real-time transparent communication in a secured way between individuals who share a same field of interest while at the same time using the Internet infrastructure which has low reliability but is inexpensive.

To communicate transparently and overcome the need for non-routable addresses, VPNs use a particular type of encapsulation known as tunneling which creates what is called a tunnel. This operation consists in encapsulating an A-level protocol (a passenger protocol) in a B-level protocol (transport protocol) by means of an encapsulation protocol C. Thus, the transport protocol B processes the passenger protocol A as if payload data were involved.

FIG. 3, described in detail here below, presents an example of packet encapsulation in a VPN of level 2, i.e. of encapsulation in a level-2 tunnel (a level-2 tunnel means that the passenger protocol A is a protocol of the layer 2 of the ISO model which describes the services offered by each of these layers and their interactions).

Tunneling may be used to transport a network protocol on a network that does not support it. It can also be used to provide different types of VPN functions such as for example private addressing.

Tunneling techniques are now increasingly used by remote-access client functions and by home local area networks (LANs).

Here below in the description, we consider, by way of an example, solely level 2 or level 3 tunnels for which the level of the transport protocol B in the ISO model is equal to that of the transport layer (level 4 layer in the ISO model).

VPNs are frequently used to interconnect two LANs in order to create a virtual local area network formed by the union of two original LANs. Secured VPNs include a cryptography and authentication algorithm to guarantee the secrecy of the transported data. A typical VPN configuration based on a tunneling technique is illustrated in FIG. 1 (described in detail here below). In this example, the tunnel end-points or TEPs are not integrated into the gateways. The tunnel is set up between two tunnel end-points and each packet (also called a frame) sent to an apparatus connected to the remote LAN is encapsulated by the local tunnel end-point and then sent to the remote tunnel end-point. For the apparatuses, they are virtually connected to a same LAN. Communication between two apparatuses through the tunnel is called end-to-end communication.

At present VPNs with multiple connection techniques, i.e. tunnels formed by several carriers or channels, are appearing. This technique enables the choice of a first transport protocol, for example for control data, and a second transport protocol, for example for payload data, the two types of data passing through a same tunnel end-point. There are many other possibilities as regards the choice of the transportation protocol for passenger applications stream (for example as a function of the priorities of the passenger streams). The term used then is "virtual channel" of a tunnel formed by numerous channels each having its own transport protocol, it being known that only the tunnel end-point knows these channels. The choice of the transport protocol can therefore be optimized for each of the channels.

Here below in the description, this type of tunnel shall be called a "multi-transport tunnel".

In the prior art, the internet protocol (IP) of layer 3 of the ISO model or the TCP/UDP (transmission control protocol/user datagram protocol) protocols of layer 4 of the ISO model are mainly used. Since tunneling technologies based on IP cannot take account of network address translation (NAT) mechanisms and since they are not entirely compatible with the typical tunneling configuration of FIG. 1, we shall (solely by way of an example) here below in the description considered solutions based on the layer 4 (transport layer), i.e. on the TCP or UDP protocol.

The TCP protocol is defined by the RFC-793 (RFC=request for comment) standard of the IETF (Internet Engineering Task Force) which produces most of the new Internet standards. This is a transmission protocol with an automatic repeat request (ARQ) based on the mechanisms of congestion and retransmission control and thus provides for the delivery of each packet to the destination.

The UDP protocol is far simpler and faster protocol which does not take account of the order of the frames and does not manage any acknowledgement.

As specified here above, the TCP protocol was designed to be flexible and work in a wide variety of network communication environments, including slow and fast links, with high latency or links with variable error rates. Although the TCP protocol works for different environments, its performance characteristics (especially the bandwidth) are affected by the characteristics of each communications link used. The performance characteristics of the TCP protocol in terms of bandwidth suffer in environments with lengthy conveyance times and/or having a high error rate.

In the case of the Internet, the connections normally used are of the "best effort" type i.e. the connections do whatever is possible to convey information to their destination, but do so without ensuring a certain quality of service (QoS). Thus, in VPN communications, the transport layer of the tunnel is subjected to high fluctuations in transmission capacities.

The multi-channel sound format is an audio format aimed at approaching natural listening quality. It gives sound a notion of space and thus enables the listener to be surrounded as well as immersed. It makes it possible quite simply to reproduce the event in a cinema hall or at home with all the high emotions available in a concert hall, a stadium, an exterior area or the theatre.

Multi-channel audio formats such as Dolby Digital or the DTS (Digital Theater System) have become predominant in a home cinema system. Formats typically recognized are the 4.0, 5.1 and more recently the 7.1 formats. For example, the Dolby Digital 5.1 format supports two front speakers, two rear speakers, one centre speaker and one low-frequency effects (LFE) speaker. The 7.1 format furthermore adds two additional channels to support two side speakers.

Since a multi-channel stream (such as audio) must be transmitted and rendered in real time, the transport protocol for this stream must provide for delivery with minimum error or loss, without discontinuity and preferably with low latency. The absence of discontinuity is a predominant criterion of quality (or QoE for Quality of Experience) perceived by the user because the smallest interruption in the transmission of the stream (a loss or delay) results in a perceptible break (for example a break in a musical piece being listened to).

Indeed, as described here above, since the TCP protocol is not designed for transporting data in real time, the UDP protocol would be more capable of responding to this need except that it does not provide any stream control mechanism.

This is why the RTP (the real time transport protocol which is a RFC-3550 standard) situated at the level of the application according to the ISO layer, uses the underlying UDP transport protocol in order to provide an end-to-end transport function for real-time applications in multicast type network services (i.e. where a message is sent to several intended recipients simultaneously) or unicast type network services (where a message is sent to a single intended recipient).

The UDP protocol is classically made specific for the applications in view and there are several existing formats. For example for audio and video conferences, the format is defined by the RFC-3551 standard, for the transporting of MPED1/2 video streams it is the RFC-2250 standard and for the AC-3 audio stream transport, it is the RFC-4184 standard.

However, it is planned that for multi-channel sessions, the samples of a same point and time should be in the same RTP packet.

The lost of an RTP packet results in the loss of a time sample for all the channels of the multi-channel stream conveyed.

In order to optimize the bandwidth for the real-time applications to be transmitted on the Internet, the TCRTP (Tunneling Multiplexed Compressed Real-Time Transport Protocol defined by the RFC-4170 standard) is used for the compression and multiplexing of RTP multimedia streams. This is a protocol that acquires no modification of existing RTP applications because the tunneling mechanisms are incorporated into external concentration devices such as Internet gateways.

This TCRTP protocol requires no additional processing of the routers of the global network traversed relies on different standardized protocols such as:—
- the ECRTP header compression protocol (Enhanced Compressed Real-Time Protocol under the RFC-3545 standard) for the compression of IP/UDP/RTP headers;
- the PPP (Point-to-Point Protocol) layer multiplexing protocol, i.e. PPP-MUX, RFC-3153 standard, enabling the aggregation of RTP multiple streams;
- the L2TP (Layer Two Tunneling Protocol under the RFC-2661 standard) enabling the creation of "level 2" tunnels in supporting PPP sessions. L2TP tunneling on IP networks uses the UDP protocol and a series of L2TP messages for the management of the tunnel.

Thus, during temporary congestion on the Internet of the RPV tunneling according to the TCRTP protocol, the loss of a packet of the tunnel results to the loss of a time sample of all the multiplexed RTP streams, and this is done for all the channels of each of the streams.

In conclusion, the smallest loss on a TCRTP tunnel has a yet greater effect if each RTP stream were to be transmitted in isolation (outside the RPV tunnel).

To date, there is no method of transportation through a global network (such as the Internet) for multi-channel applications conveyed according to the RTP protocol on a local (LAN) network ensuring delivery without any perceptible interruption to the destination multimedia apparatus.

2. BACKGROUND OF THE DISCLOSURE

There are two categories of known principles for improving the conveyance of real-time streams (or streaming) in an unstable environment (such as the Internet or wireless links). A first principle consists in acting on the transport protocol itself as described in the US patent document 2006/0198300A1 (by EPSON Research and Development Incorporated, "Multi-channel TCP connections").

This patent document describes an example of operation of the principle where multiple TCP connections (Multi-TCP connections) are set up between two remote apparatuses (such as tunnel end-points or Internet gateways) on which the application streams will be transmitted.

Starting from the observation according to which the TCP protocol is reliable but does not ensure a constant real-time bit-rate during losses, the idea consists of the use of an aggregate of TCP connections in order to obtain a more regular total bit-rate. The present patent document discloses a technique for selecting one of the TCP carriers to transmit each passenger packet as a function of the state of congestion of the TCP connections.

When a TCP connection undergoes a great reduction of its connection window (named "cwnd" according to the TCP protocol), it means that there is a momentary congestion. Then, another TCP connection with a greater available congestion window is chosen. Thus, if a packet is lost and is being retransmitted on the first connection, the following packets will not be subjected to this congestion on another TCP carrier.

The advantage of this approach pertains to the reliability of transport. However, the passenger stream conveyed through multiple TCP connections is nevertheless disturbed. There are no longer losses but delays in delivery for the packets retransmitted on each of the TCP connections.

According to the multi-TCP principle, the large number of TCP connections entails an equivalent increase in the probability of loss or retransmission. Thus, the de-sequencing of the data upon arrival (not described in the patent document mentioned here in) calls for a latency that is all the longer in order to be corrected.

Thus, the solution of this patent document provides a partial response to the problem of data loss but does not provide for regular delivery of RTP streams without interruption.

A second principle consists of action on the content transported as described in the RFC-2198 standard "RTP Payload for Redundant Audio Data".

An FEC (forward error correction) type mechanism is a mechanism for protection against errors used during data transmission. The sender adds redundancy in order to enable the intended recipient to detect and correct at least one part of the errors. This prevents retransmission and therefore provides for bandwidth savings and even ensures transmission in certain situations where there is no return channel.

The RFC-2198 standard lays done the principle according to which redundant copies of audio data elements are transmitted in a single RTP stream in order to correct disturbances related to losses in the transportation of the RTP stream.

Thus each RTP packet contains a piece of audio data for a same time slot and a (more compressed) copy of the audio data of a previous time slot. This enables an approximate recomposition of the samples lost from the decoding of the next packet.

This solution requires substantial over-occupation of the available bandwidth so as to convey data in duplicate, and is therefore better suited to WLAN (wireless local area network) wireless environments subject to losses of data as well as to WAN environments where the non-delivery of a packet results from a phenomenon of congestion on the path.

Thus, in this second approach, the redundancy of the information only aggravates the phenomenon of congestion in the WAN global network where bandwidth is limited.

3. GOALS OF THE DISCLOSURE

It is a goal of at least one embodiment of the invention to prevent or limit phenomena of interruptions in the rendering of a multi-channel stream in transit on a tunnel and more particularly to provide a technique of transport for the regular and uninterrupted delivery of the multi-channel stream. This method will be described more specifically in the context of a multi-channel audio application but could be applied to any multi-channel stream in general.

It is another goal of at least one embodiment of the invention to provide a technique of this kind to reduce memory resources at reception.

It is an additional goal of at least one embodiment of the invention to provide a technique of this kind to improve the bandwidth of the tunnel for the payload data.

It is also a goal of at least one embodiment of the invention to provide a technique of this kind that is simple to implement and costs little.

4. SUMMARY

One particular embodiment of the invention proposes a method of transmitting a multi-channel data stream comprising frames comprising a plurality of channels, the transmitting being done via a multi-transport tunnel from a first tunnel end-point to a second tunnel end-point, said tunnel implementing a first carrier supporting a transport protocol with acknowledgement and a second carrier supporting a transport protocol without acknowledgement, This method is remarkable in that the first tunnel end-point performs steps, for a given frame of said stream, of:
  obtaining at least one piece of information on quantity of data of said multi-channel data stream received by the second tunnel end-point;
  routing the channels of a frame of said multi-channel data stream received by the first tunnel end-point to one of said carriers of the tunnel, as a function of said at least one piece of information obtained;
  supplying one piece of synchronization information with said channels;
  transmitting to the second tunnel end-point each of the channels of said given frame via the carrier to which said channel has been routed as well as its supplied piece of synchronization information.

Thus, the invention relies on an approach of using information on quantities of data of said multi-channel data stream received by the second tunnel end-point to route the individual channels of the multi-channel stream and thus facilitate the re-composition of the original stream.

Again, this method enables regular and uninterrupted delivery of the multi-channel stream.

Advantageously, the piece of information on synchronization supplied with a channel is a piece of time-stamp information extracted from said multi-channel data stream.

Thus, the invention uses a piece of information already contained in the initial frame to synchronize each channel and classify it at reception. It is therefore not necessary to use an additional piece of information. The bandwidth is thus optimized.

Advantageously, this method comprises a step of obtaining at least one piece of information on a piece of information on congestion of the first carrier.

Furthermore, said step of routing each of the channels is also performed as a function of said piece of information on congestion obtained.

Thus, in the event of congestion on the first carrier, the distribution of the channels on first and second carriers it optimized so as to preserve optimum activity without overloading it. The routing can especially be adjusted permanently for the dynamic distribution of the channels on the first and second carriers.

Advantageously, said piece of information or said pieces of information on quantities of data of said multi-channel data stream received by the second tunnel end-point belongs or belong to the group comprising:
  information on a filing of a reception buffer included in said second tunnel end-point;
  information on a data loss rate of said stream transmitted on said at least one second carrier.

According to the invention, it is proposed to correct the policy of switching the individual channels of the multi-channel stream as a function of the difficulties encountered and/or anticipated by the second tunnel end-point to re-compose the stream. Thus, the invention reacts by anticipation of the problems to come as well as for example the congestion of the network.

According to an advantageous characteristic of the invention, the pieces of information on a filing of a reception buffer belong to the group comprising:
  a first piece of information on difference between an instantaneous filling value and a reference filling value, the filling referring to a part of said reception buffer for receiving data from the first carrier;
  a second piece of information on difference between an instantaneous filling value and a reference filling value, the filling referring to a part of said reception buffer for receiving data from the second carrier
  a third piece of information on difference between a number of pieces of payload data of said multi-channel data stream and a reference filling value, a piece of payload data being a frame having available channels present in a part of said reception buffer for receiving data from the first carrier as well as channels present in a part of said reception buffer for receiving data from the second carrier.

Thus, this information enables a regular updating of the algorithm for switching channels on the first and second carriers.

According to a second advantageous characteristic, said method comprises a step among the group of steps of:
  routing to the first carrier of a number of channels of a current frame greater than a number of channels of a previous frame routed to said first carrier, if the third piece of information on difference is positive and if the first piece of information on difference is greater by at least one first predetermined divergence than the second piece of information on difference;

routing certain channels of a current frame to none of said first and second carriers, if the third piece of information on difference is positive and if the first piece of information on difference is not greater by at least said first predetermined divergence than the second piece of information on distance;

routing a number of channels of a current frame to the first carrier, this number being smaller than a number of channels of a previous frame routed to said first carrier, if the third piece of information on difference is negative, if the first piece of information on difference is greater than a predefined portion of said reference value and if a congestion of the first carrier is detected;

routing channels of a current frame, which were routed for a previous frame solely to said first carrier, to the first and second carriers, if the third piece of information on difference is negative, if the first piece of information on difference is greater than a predefined portion of said reference value and if no congestion of the first carrier is detected;

routing a number of channels of a current frame to the first carrier that is greater than a number of channels of a previous frame routed to said first carriers if the third piece of information on difference is negative and if the second piece of information on difference is greater than a predefined portion of said reference value.

Thus, through this information, the invention is used to optimize the distribution of data among the first and second carriers.

Advantageously, said method comprises a step of associating a piece of priority information with each of the channels as a function of a predetermined profile of an application conveyed by said stream, said step of routing each of the channels being also performed as a function of pieces of priority information associated with the channels.

Thus, the invention adapts the default mode of transport of the tunnel carrier according to the type of stream of the multi-channel data to be transmitted. For example, depending on the application conveyed, the classification of the channel differs according to whether the application is of an audio streaming type or of a video conference type.

In another embodiment, the invention relates to a computer-readable storage means, storing a set of instructions that can be executed by a computer to implement a method of transmitting a multi-channel data stream comprising frames comprising a plurality of channels, the transmitting being done via a multi-transport tunnel from a first tunnel end-point to a second tunnel end-point, said tunnel implementing a first carrier supporting a transport protocol with acknowledgement and a second carrier supporting a transport protocol without acknowledgement. This computer-readable storage means is remarkable in that the first tunnel end-point performs steps, for a given frame of said stream, of:

obtaining at least one piece of information on quantities of data of said multi-channel data stream received by the second tunnel end-point;

routing the channels of a frame of said multi-channel data stream received by the first tunnel end-point to one of said carriers of the tunnel, as a function of said at one least piece of information obtained;

supplying one piece of synchronization information with said channels;

transmitting to the second tunnel end-point each of the channels of said given frame via the carrier to which said channel has been routed as well as their associated piece of synchronization information.

The invention also pertains to a first tunnel end-point participating in a transmission of a multi-channel data stream comprising frames comprising a plurality of channels, the transmission being done via a multi-transport tunnel from a first tunnel end-point to a second tunnel end-point, said tunnel implementing a first carrier supporting a transport protocol with acknowledgment and a second carrier supporting a transport protocol without acknowledgment. The first tunnel end-point is remarkable in that it comprises:

means for obtaining at least one piece of information on quantities of data of said multi-channel data stream received by the second tunnel end-point;

means for routing said channels of a frame of said multi-channel data stream received by the first tunnel end-point to the of said carriers of the tunnel, as a function of said at least one piece of information obtained;

means for supplying one piece of synchronization information with said channels;

means for transmitting to the second tunnel end-point each of the channels of said given frame via the carrier to which said channel has been routed as well as its supplied piece of synchronization information.

Advantageously, the piece of information on synchronization supplied with a channel is a piece of time-stamp information extracted from said multi-channel data stream.

Advantageously, the first tunnel end-point comprises means for obtaining at least one piece of information on a piece of congestion information of the first carrier.

According to an advantageous characteristic, said piece of information or said pieces of information on quantities of data of said multi-channel data stream received by the second tunnel end-point belongs or belong to the group comprising:

pieces of information on a filing of a reception buffer included in said second tunnel end-point;

pieces of information on a data loss rate of said stream transmitted on said at least one second carrier.

According to an advantageous characteristic of the invention, the pieces of information on a filing of a reception buffer belong to the group comprising:

a first piece of information on difference between an instantaneous filling value and a reference filling value, the filling referring to a part of said reception buffer for receiving data from the first carrier;

a second piece of information on difference between an instantaneous filling value and a reference filling value, the filling referring to a part of said reception buffer for receiving data from the second carrier;

a third piece of information on difference between a number of pieces of payload data of said multi-channel data stream and a reference filling value, a piece of payload data being a frame having available channels present in a part of said reception buffer for receiving data from the first carrier as well as channels present in a part of said reception buffer for receiving data from the second carrier.

Advantageously, the first tunnel end-point comprises means for associating a piece of priority information with each of the channels as a function of a predetermined profile of an application conveyed by said stream, said means for routing each of the channels also performed as a function of pieces of priority information associated with the channels.

5. BRIEF DESCRIPTION OF THE DRAWINGS

Other features and advantages of embodiments of the invention shall appear from the following description, given by way of an indicative and non-exhaustive example and from the appended drawings, of which:

FIG. 6a is a schematic view illustrating an example of a format of an Ethernet frame conveying a tunnel packet according to a particular embodiment of the invention;

FIG. 6b is a schematic view illustrating an example of an AVP structure according to the L2TP protocol and according to a particular embodiment of the invention;

6. DETAILED DESCRIPTION OF ILLUSTRATIVE EMBODIMENTS

Here below in the description, the method of the invention is described in more amply detail in the context of a multi-channel audio application but can also be applied to any multi-channel stream in general.

Figure 1:
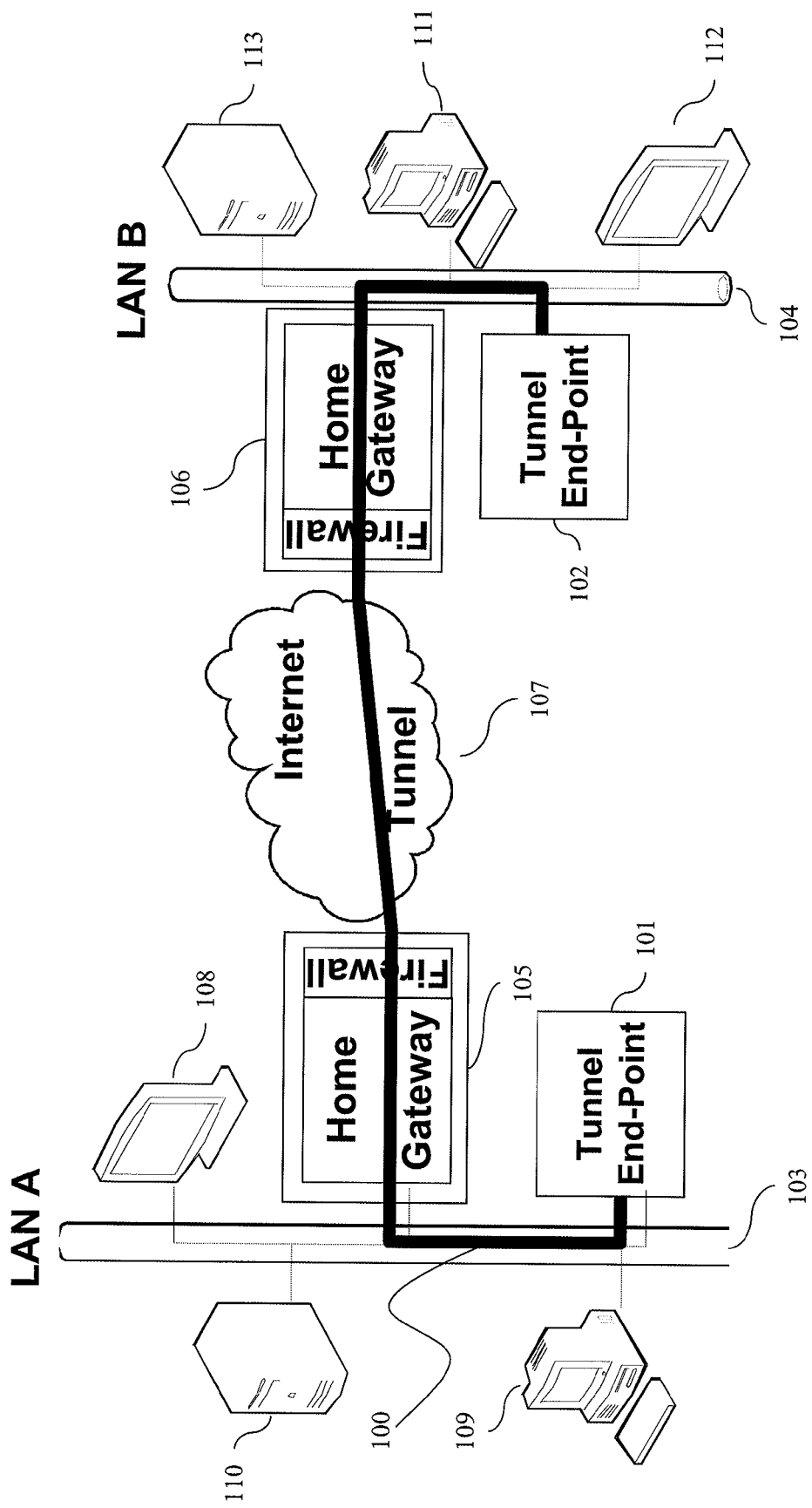
FIG. 1 is a schematic view of a classic configuration of a virtual private network (VPN) implementing a tunnel.

FIG. 1 provides a schematic illustration, according to a particular embodiment of the invention, of a virtual private network (VPN) implementing a tunnel 100 between a local tunnel end-point 101 and a remote tunnel end-point 102, through a communications network 107 (the Internet for example). This tunnel 100 connects a LAN A 103 and another LAN B 104. Each of the LANs 103 and 104 has a high-bit-rate Internet access apparatus of a home gateway type capable of integrating a firewall 105 and 106, PC type apparatuses 109 and 111, servers 110 and 113 for the storage and distribution of the digital media (of the audio, video and photo type) as well as digital media rendering apparatuses 108 and 112.

A tunnel end-point may be integrated into an audiovisual apparatus such as a digital television set. It can also be present in a PC type apparatus in the form of a program performing the functions associated with it.

Once the tunnel 100 is set up, the apparatuses 108, 109, and 110, connected to the LAN A 103, are capable of communicating with the apparatuses 111, 112 and 113, connected to the LAN B 104. For example, the local client 108 connected to the LAN A 103 can communicate with the server 113 connected to the network LAN B 104.

This FIG. 1 shows a simple communications network with only one tunnel, but it is understood that a same tunnel end-point may have to manage several tunnels (going to an equivalent number of tunnel end-points) to interconnect a first LAN with several other LANs. Furthermore, for the sake of simplification, the figure does not show the infrastructure apparatuses in the Internet such as the Internet routers.

Figure 2:
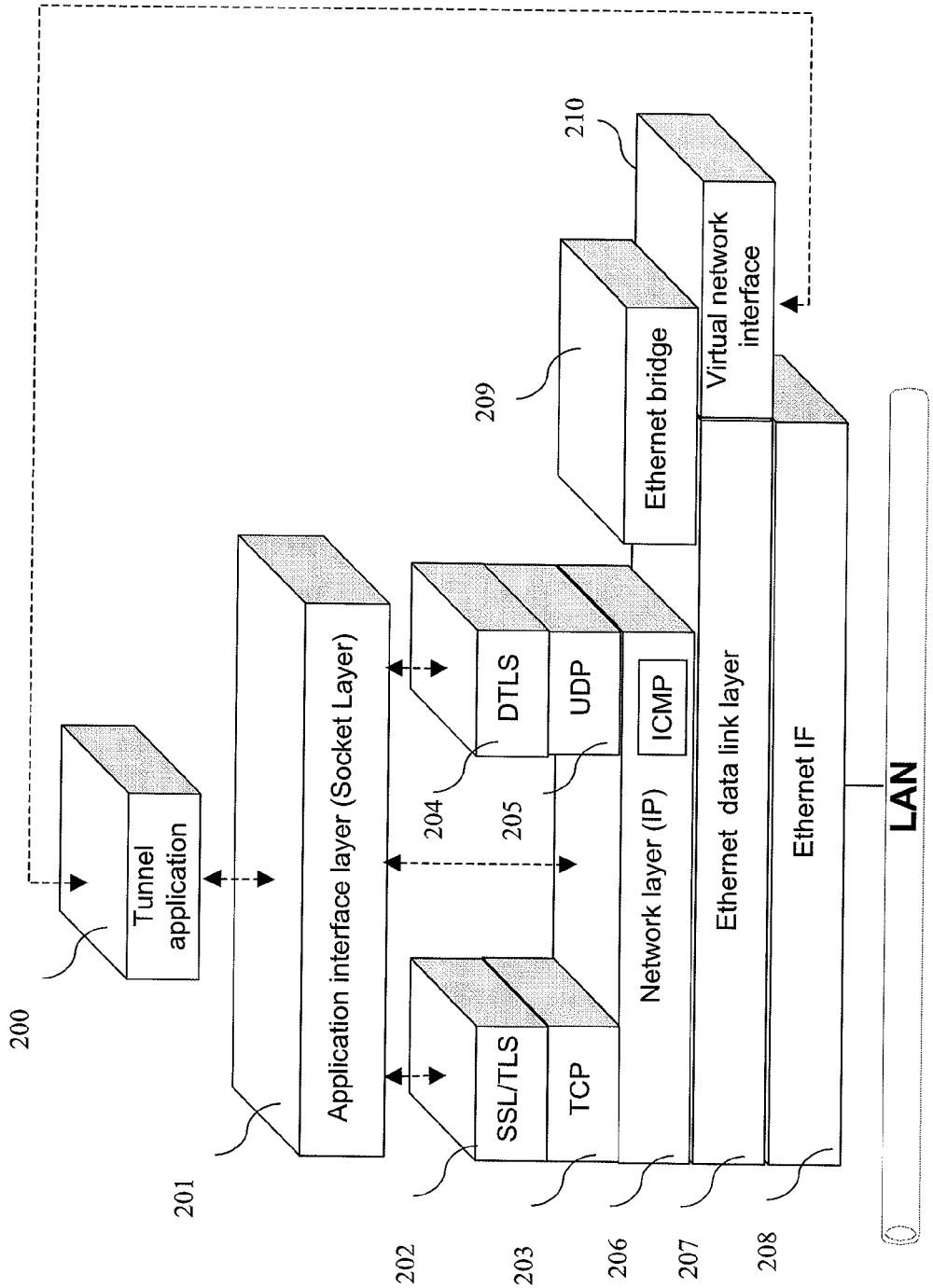
FIG. 2 is a schematic view of a classic layered model of a tunnel end-point in which the method according to a particular embodiment of the invention can be implemented.

FIG. 2 schematically illustrates the routing of an Ethernet frame that comes from one of the apparatuses 108, 109, 110 (connected to the LAN B 103) that will enter the tunnel 100. A layered model describing the protocol layers needed for the implementation of this tunnel 100 is used to describe this routing. In this model, the protocol elements necessary for functions other than the use of the tunnel are not represented. For example, the protocol elements associated with a UPnP architecture, when a first tunnel end-point 101 is integrated into a UPnP apparatus, are not shown.

The first tunnel end-point 101 has a Ethernet physical interface 208 which hands over the Ethernet frames coming from one the apparatuses 108, 109, 110 to the link layer 207 for routing toward the network layer 206 (for the Ethernet frames intended for the apparatus comprising the tunnel end-point) or toward the bridge layer 209 for the other Ethernet frames. The bridge layer 209 carries out the classic operations of an Ethernet bridge such as the filtering of Ethernet frames and the relay of these frames to the appropriate Ethernet output port or ports. The bridge has an Ethernet interface 207 and at least one virtual interface 210, simulating an Ethernet controller, attached to it. A virtual interface 210 is created for each tunnel instantiated by the application 200 to which it gives the Ethernet frames that must travel in transit on the respectively instantiated tunnels. Generally, the protocol of encapsulation of the tunnel represented by the application 200 performs the operations necessary for implementing each tunnel, among them in particular configuration, filtering and encapsulation (formation of a tunnel packet) and the extraction of a frame.

The frames received from the virtual interface 210, after processing by the application 200, are handed over in the form of a packet through an applications interface or socket 201 to a reliable TCP transport protocol 203 or to a non-reliable UDP transport protocol 205, respectively secured by the SSL protocol 202 and the DTLS protocol 204. After processing by a transport protocol to form the tunnel packet, this packet is passed on to the network layer 206. The IP datagram thus formed with the current packet can then be transmitted on the LAN sub-network through the link layer 207 and physical layer 208.

The reception of a frame coming from the tunnel 100 will follow a path in the tunnel end-point that is in reverse to the path presented here above.

Figure 3:
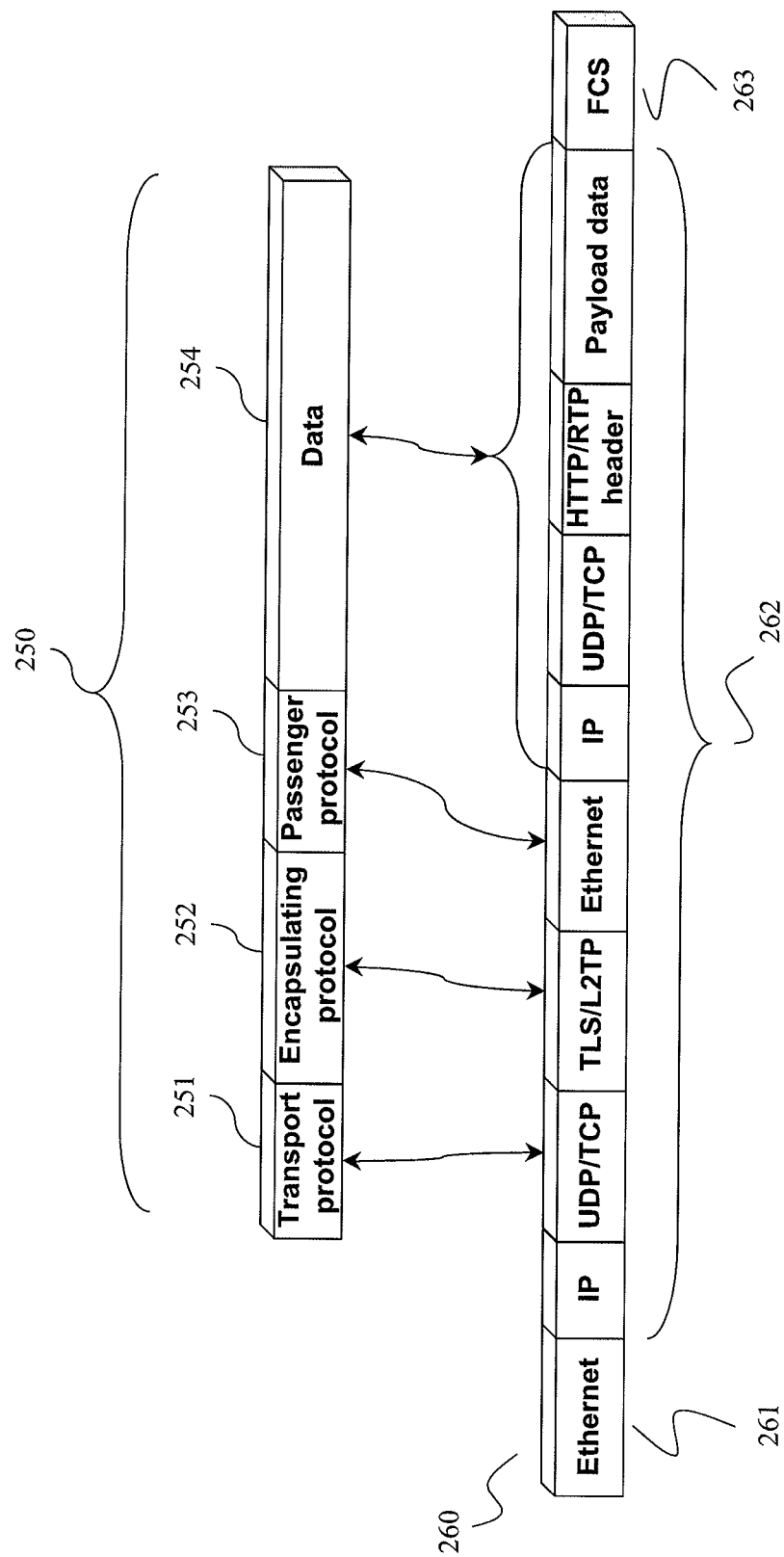
FIG. 3 is a schematic view illustrating an example of a classic format of an Ethernet frame conveying a level 2 tunnel packet.

FIG. 3 shows an example of a classic format of an Ethernet frame 260 in transit for example on the network LAN A 103 of FIG. 1 and comprising an Ethernet header field 261, a first IP datagram 262 itself conveying a level 2 tunnel packet 250 and an FCS (Frame Check Sequence) field 263.

The tunnel packet 250 has four parts:

a transport protocol header field 251 (namely a TCP or UDP field in this example), a header field of the encapsulation protocol 252 (namely L2TP or TLS in this example, described especially in the following documents "IETF RFC3931, "Layer two tunneling protocol—version 3 (L2TPv3)", J. Lau et al, March 2005 and <<IETF RFC2246, "The TLS Protocol Version 1.0"<<), a header field of the passenger protocol 253 (namely Ethernet in this example);

a user data field 254 which itself comprises a second full IP datagram if no fragmentation has taken place in transit from the source apparatus.

Figure 4:
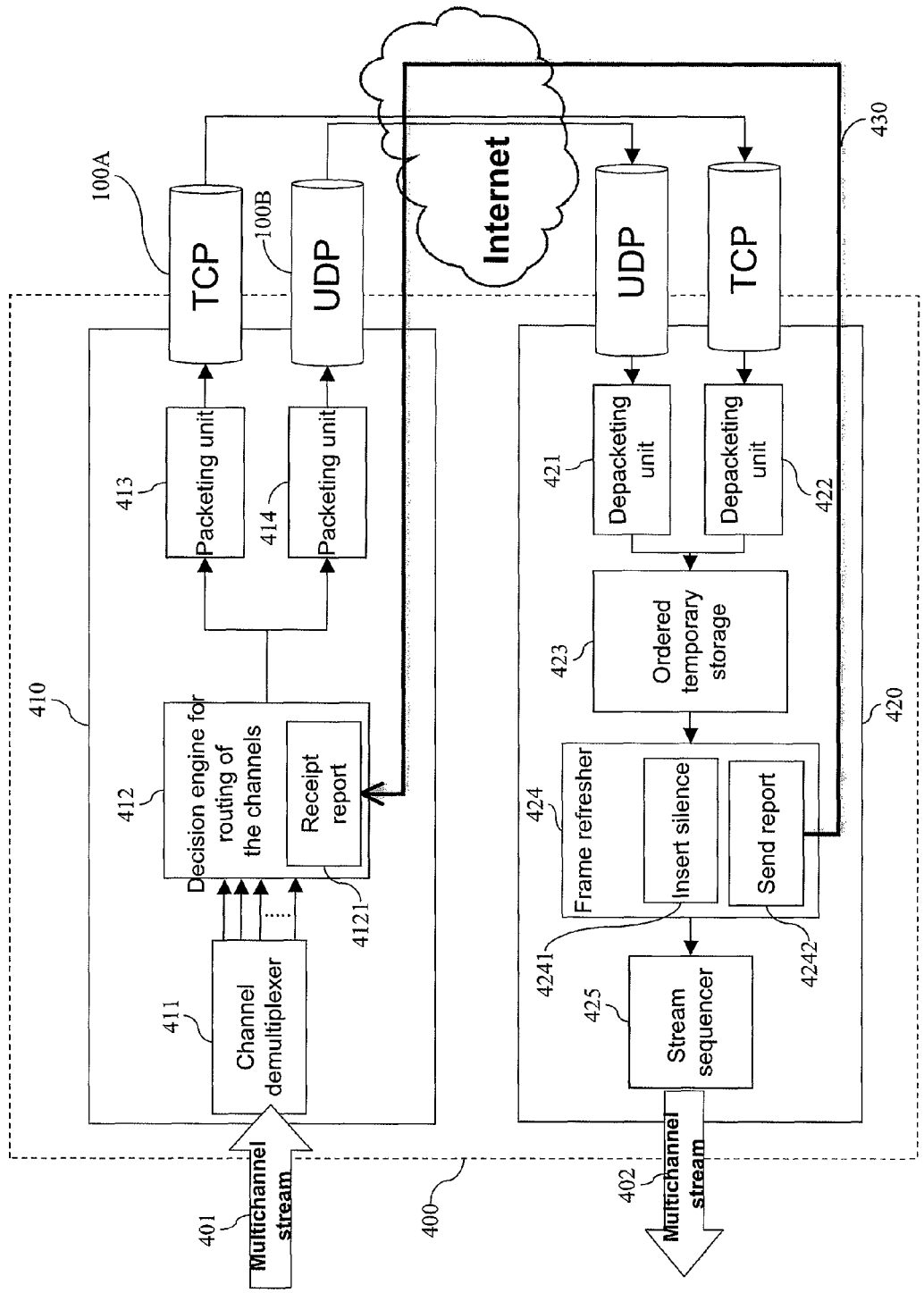
FIG. 4 is a schematic view illustrating a tunnel end-point implementing the present invention according to one particular embodiment of the invention.

FIG. 4 is a schematic illustration of a scenario for the application of one embodiment of the invention with reference to the environment described with reference to FIG. 1 where the functional structures of a sender 410 and a receiver 420 according to the present invention are represented.

The algorithms of the invention are described according as being set up on the tunnel end-points 101 and 102 of FIG. 1.

Thus, each tunnel end-point 101 or 102 embeds the particular sender block 410 and receiver block 420 of the invention to/from a multi-transport VPN tunnel.

According to the diagram of FIG. 4, the module 410 is implemented on a first tunnel end-point (for example 101) and the module 420 is implemented on the second tunnel end-point (for example 102) connected to one another by the different carriers of the multi-transport tunnel (in this case 100A for the TCP protocol and 100B for the UDP protocol).

It is clear however that the invention cannot be limited to these two particular types of protocol and pertains to other types of protocol which can be implemented by the invention.

For example, the protocol with acknowledgement is of the SCTP (Stream Control Transport Protocol) type and the protocol without acknowledgement is of the DCCP (Datagram Congestion Control Protocol) type.

The module 410 receives the multi-channel RTP stream 401 at input and is responsible for handling it in order to transport the data of this RTP stream through the multi-transport tunnel 100 with the greatest efficiency.

The module 420 receives these pieces of data from the tunnel 100 and will reconstitute an RTP multi-channel stream 402 which is also as compliant as possible with the original multi-channel stream 401.

It may be recalled that the description is focused on multi-channel streams conveyed on the RTP transport protocol because this is a preferred approach of the prior art for conveying broadcast streams in real-time. However, according to an optional embodiment (not described) any other mode of transportation (such as HTTP for example) is compatible with the means of the present invention.

The sender module 410 consists of the following elements:
a channel demultiplexer 411 responsible for extracting the audio channels conveyed in a RTP multi-channel stream 401 which is an applications stream received from the local network (for example the LAN A network 103);
a decision engine 412 responsible for switching each of the audio channels identified by 411 on at least one of the carriers of the multi-transport tunnel;
packeting units 413 and 414 proper to each carrier of the multi-transport channel supporting the encapsulation of the channels identified by the module 411 and switched towards them.

The receiver module 420 is formed by the following elements:
de-packeting units 421 and 422 proper to each carrier of the multi-transport tunnel, supporting the de-encapsulation of the data conveyed through their reciprocal carrier of the tunnel and enabling the re-composition (or re-association) of the passenger audio channels corresponding to a same synchronization identification (more amply described here below in the invention);
a storage zone 423 in charge of reordering the applications data (channels individually received and reordered according to their synchronization marking);
a RTP frame refresh unit 424 used to reconstitute a multi-channel frame according to the applications format conveyed in the RTP packet 401 on the basis of information received from the sender 410 and preserved in the storage 423;
a stream sequencer 425 responsible for delivering on the local network (for example the LAN B network 104) the RTP packets (or frames) according to the time stamp or time marking indicated in the original RTP packets (or frames) 401.

Owing to the temporary storage zone 423 which enables an absorption of the fluctuations of latency of the Internet and according to the methods set up in the refresh module 424, the sequencer 425 is continually powered and is capable of transmitting a multi-channel RTP stream on its local network with almost zero jitter.

This is particularly advantageous in the case of the transporting of continuous multi-channel streams (streaming) on RTP as in the case of audio or video non-interactive broadcasting applications, i.e. when the receivers of these types of streams are little concerned by the latency inherent to the network for the transport of multi-channel data from the source (connected to the remote network).

According to the invention, these receivers are given an architecture so as to receive a multi-channel stream 401 regularly as if the source were on the same local LAN type sub-network (with almost constant inter-packet time, something that is not possible in transmission on the Internet according to the mechanisms of the prior art).

Figure 5:
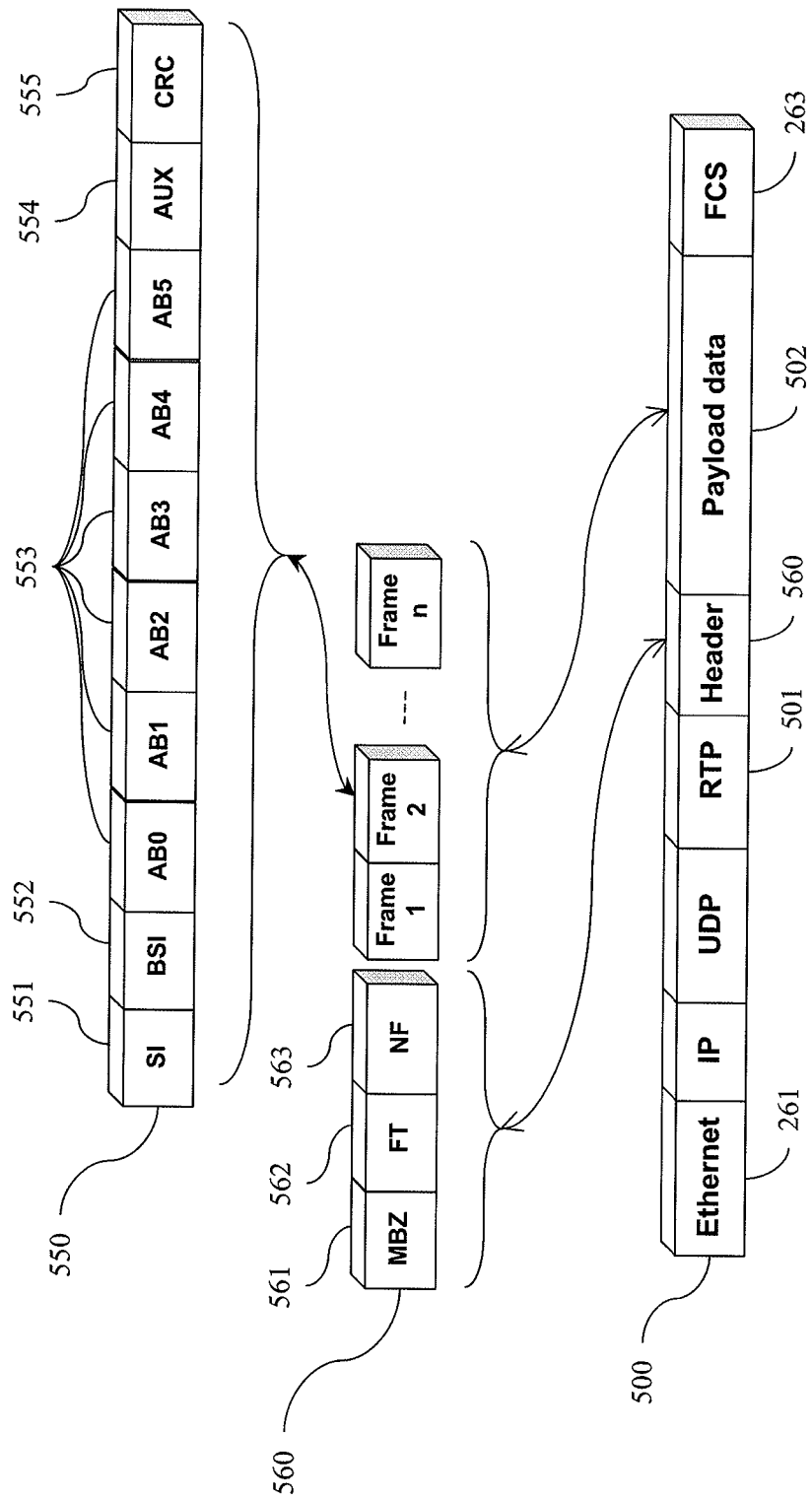
FIG. 5 is a schematic view illustrating an example of a multi-channel stream supported by the mechanisms of the present invention according to a particular embodiment of the invention.

FIG. 5 (described in more ample detail here below) provides a schematic and indicative illustration of the examples of multi-channel streams 401 conveyed according to the RTP protocol. The present invention is capable of conveying these examples of steams on the tunnel so as to meet the previously explained problems. An example of a multi-channel audio stream is a multi-channel stream in the AC-3 format comprising for example 6 separate audio channels (in the case of the 5.1 type AC-3 format). This type of stream is used here below in the description solely as an example because the present invention can take any multi-channel format (audio alone, audio/video or video alone).

Once the channels of the multi-channel stream have been identified, the channel demultiplexer 411 proposes a list of channels to the routing decision engine 412. This list is formed by channels corresponding to pieces of information extracted as such from the stream 401 (for example an AC-3 RTP stream, the different ABi blocks 553 of FIG. 5 described in greater detail here below) as well as a "virtual" data channel (representing a set of payload data needed for the rebuilding of the multi-channel stream 402 by the destination tunnel end-point denoted as data 'CB0' (control block) indexed 0 and not shown).

According to one particular embodiment of the invention, a piece of information on criticality is associated with each ABi or CB0 channel in order to indicate whether the channel should be transmitted reliably or not. This information on rank is especially useful for the decision engine 412 to select the channels in order to modify their switching according to the results of transport on the channel (typically, it will be preferred to downgrade the quality of the audio channels considered to be less important to the benefit of the other channels).

The operating algorithm of the decision engine 412 is described in more ample detail here below in the description with reference to FIG. 9. Thus, certain channels are directed to the packeting unit 413 and others to the packeting unit 414.

The encapsulation mechanisms implemented by the packeting units 413 and 414 and the de-encapsulation mechanisms implemented by the depacketing units 421 and 422 convey data according to the protocol described with reference to FIG. 6 described in more ample detail here below. Thus, a synchronization element is inserted into the encapsulation/ de-encapsulation protocol in order to be conveyed as a accompaniment of each element of the multi-channel stream in order to enable a fine identification of the channel sample by de-encapsulation 421 and 422 and to enable a re-association of the channel samples of the stream which were originally in the same stream frame 401 and which had been separated on each of the carriers 100A and 100B of the tunnel.

The mechanisms and architecture of temporary storage 423 are described with reference to FIG. 7 and perform the rescheduling of the various samples of channels of the stream 401 received by the depacketing units.

The frame refresher 424 is capable of obtaining the information preserved in the storage 423 for the various audio channels received and thus reconstitute a multi-channel frame according to the original format of the stream 401. For example, the data channels ABi and the virtual channel CB0 are considered in order to constitute a frame according to the AC-3 format.

According to one particular embodiment of the invention, a information signal 430 is conveyed between the frame refresh unit 424 (more particularly its report sender 4242) and the decision engine 412. This information signal 430 indicates the capacitor of the frame refresh unit 424 to re-create multi-channel frames according to the availability of information in the storage 423. This information is particularly useful for the decision engine 412 of the module 410 to correct the policy of switching of the individual channels of the multi-channel stream 401 to the TCP or UDP carriers of the multi-transport tunnel.

Should there be applications data lacking for the rebuilding of the frames for the stream 402, the frame refresh unit 424 has a correction system 4241 capable of replacing the missing data according to an adequate substitution technique. For example, for an audio stream, a low-cost method, which is simple and widespread consists in inserting silence (or more generally synthetic data) or noise. A repetition technique can also be put into practice.

The stream sequencer of 425 for its part is responsible for regularly transmitting the multi-channel frames (obtained by the frame refresh unit 424) through the RTP protocol (stream 402). This sequencing depends on the original RTP time stamp of the stream 401 for which the information has been conveyed through the tunnel. The stream sequencer 425 is not been described in greater detail because there is a multitude of implementations in the prior art enabling a RTP stream transmission to be sequenced.

The original server that has originated the multi-channel stream 401 of the remote sub-stream works especially on this principle.

FIG. 5 provides a schematic illustration of an example of a multi-channel stream 401 supported by the mechanisms of the present invention.

The IETF defines several methods of encapsulation of multi-channel multimedia content in the RTP protocol.

Among these methods, we may note:
 the codec (compression-decompression) AC-3 audio methods; or
 the Dolby digital method formally called the Dolby AC3 method which is especially the format mostly commonly used for DVD-video disks and is adopted for the broadcasting of land television by the ATSC (advanced television standards committee) for streaming or continuously broadcasting on LAN type networks by the DLNA (digital living network alliance).

There are several existing versions of AC-3 type encoding: 1.0 (mono) which is very rare, 2.0 (stereo), 5.1 (5 channels for the satellite speakers and one channel for the sub-woofer) and 7.1 (seven channels for the satellite speakers and one channel for the sub-woofer).

This is a system of digital encoding with audio data compression that uses the limits of aural perception to efficiently compress a signal and render sound on six independent channels (in the case of a 5.1 type encoding).

The RFC-4184 (<<RTP Payload for AC-3<<) recommendation stipulates the format for encapsulation in a broadcasting stream according to the RTP protocol.

FIG. 5 shows the format of an RTP frame 500 conveying AC-3 data frames.

An RTP header 501 is used to identify the type of data conveyed, especially using a "timestamp" field relative to the first sample (or frame) of AC-3 data conveyed, and with a "payload type" field identifying the format of the data conveyed (enabling the interpretation of the blocks 560 and 502). It may be recalled that a value of "payload type" field in the bracket 96-127 indicates a dynamic definition associated with a declaration by a third-party protocol (such as session description protocol (SDP), RFC-2327 standard).

The AC-3 type data stream consists of successive synchronization frames 550 in which each part represents important information for the compression and retrieval of the data.

An "SI" block 551 represents the information on the synchronization. The SI block contains a 40-bit synchronization word used to indicate the start of the AC-3 frame. This word is at the beginning of each frame.

A "BSI" block 552 contains information on the type of data conveyed in the stream. It is only on the basis of this data that it is possible to reconstitute the original samples (determine the number of channels used in addition to the woofer). Less important information is also conveyed, for example language, time, type of service (dialogue, commentary, music etc).

A set of blocks 553 "ABi" (i=1 . . . n) where each block contains audio data from the different channels. Each block consists of 256 sound samples.

An "Aux" block 554 contains supplementary or auxiliary information on the "ABi" block, this information being used if back-up data is needed.

A "CRC" block 555 enables the control of errors in order to verify that the information is not erroneous.

This frame 550 is encapsulated by a two-byte header 560, specific to the AC-3 data encapsulation (also called "payload specific header" according to the RTP protocol). Thus, the payload data zone of the header 560 has an MBZ block 561 formed by zero-setting bits, an "FT" (Frame Type) block 562, indicating the type of frame conveyed (complete or fragmented frame) and an "NF" block 563 indicating the number of AC-3 frames 550 present in the payload data zone.

If the size of an AC-3 frame exceeds the MTU (Maximum Transmission Unit) size as defined under the TCP protocol, this frame may be fragmented at the RTP transport level. According to the recommendations for implementing the RTP protocol, the fragments of this frame are conveyed in order. Thus, the demultiplexer 411 should receive several RTP packets before obtaining each of the channels of the AC-3 multi-channel stream.

The demultiplexer 411 breaks down the channel of the applications stream 401 and thus proposes the identified channels to the decision engine 412 (for example the six audio channels 553 if it is a stream 401 according to the AC-3 audio format of the 5.1 type). An additional virtual channel (not shown) is considered by grouping together the data needed to rebuild the original RTP stream through the refresh unit 424 (this channel may be formed especially by the data elements

560, 550, 552, 554 for an AC-3 audio stream in addition to the RTP timestamp information of the header 501).

The channel multiplexer 411 can manage other methods of encapsulation of the multi-channel multimedia content in the RTP protocol, for example those for the following streams:
- MPEG2-TS for which the recommendation RFC-2250 recommendation ("RTP payload format for MPEG1/MEPG2 audio and video") describes the method of transport on RTP;
- MPEG4 for which the RFC-3016 ("RTP payload format for MPEG-4 audio/visual streams") recommendation describes the transport on RTP.

The type of stream supported by these recommendations may be considered to be a bi-channel stream in the sense that the video and audio parts corresponding to separate channels (or even multi-channel if the audio part is in the AC-3 multi-channel format and not the AAC or MP3 mono-channel format).

We can also note another RTP profile applied to the interactive systems, such as the video conference format according to the RFC-3551 (RTP profile for audio and video conferences with minimal control) recommendation. Although the present invention is not suited to the transport of strict interactive streams, in the context of reliable transport on the Internet with a low latency (for example a Round Trip Time or RTT of less than 50 ms), the retention time in the storage zone 423 (one or two times the RTT) is not critical for the conversation. On the contrary, the quality of conversation in this context will be thereby improved.

FIG. 6a is an example of a format of an Ethernet frame 600 conveying a tunnel packet 601 according to the invention and traveling for example on the LAN A network 103 of FIG. 1 between the tunnel end-point 101 and the gateway 105, and comprising: an Ethernet header field 261, a first IP datagram itself conveying a tunnel packet 601 according to the invention (reference 601) and an FCS field (frame check sequence field).

The tunnel packet 601 has four parts:
- a header field of the transport protocol 251 (namely TCP or UDP in this example),
- a header field of the encapsulation protocol 252 (namely L2TP or TLS in this example, which will be described especially in the following documents: "IETF RFC-3931, "Layer two tunneling protocol—version 3 (L2TPv3)", J. Lau et al, March 2005 and IETF RFC-2246, "The TLS Protocol Version 1.0"),
- a header field of the embedded protocol 253 (namely an identification code proper to the data encapsulation format according to the invention is defined to inform the receiver of the format of the payload data 603 according to the invention), and finally
- a payload data field 603 which itself has a set of channels to be transmitted in the tunnel to the destination tunnel end-point.

Each channel 611 is preceded by a header 610 comprising information on the identification of the transported channel.

For example, if the channel 611 corresponds to an "ABi" data channel 553, this channel must be referenced by a header 610 formed by an order number 620 (as specified in the format of the multi-channel stream) as well as a synchronization index or marking 621 (enabling the grouping of the ABi data channels for a given time sample).

For a virtual channel CB0 (not shown), the header 610 has a channel number 620 that is not significant (not significant because the data elements of this channel CB0 are not data elements in the sense of samples of data of a frame of the multi-channel stream (in the case of the AC-3 frame format, this is not an audio sample), but data used for the re-composition of the RTP packet 501 and the header of the multi-channel frame 560). The synchronization index 621 is the same as that of the ABi data channels (553).

This synchronization index 621 comes for example from the timestamp value of each RTP packet of the stream 401, of which the format modulo 32 bits (unsigned integer) can be very greatly reduced. It is not a question here of having a distinct synchronization element for several megabytes of the RTP stream as allowed by the RTP timestamp (for a video stream sampled at 90 kHz, the modulo is 13 hours; for an audio stream sampled at 8 kHz, the interval is about six days), but this synchronization index 621 is used to re-order the data sent on the different carriers of the multi-transport channel, the RTT of which is equal to a few hundredths of milliseconds.

In an optimized way, the invention uses a unique header 610 for several blocks 611 of a same time index 621, these blocks 611 being placed after the common header 610.

Thus, according to a particular embodiment of the invention, the field 620 is a byte for which each bit at 1 indicates the presence subsequently of the data channel sample 611 for a same applications frame according to the transported format, the samples being ordered according to their channel number (for example according to the format 550 in the case of the AC-3 audio format of FIG. 5).

According to another particular embodiment of the invention, the header 610 supports a list of channels 611 taken from among the successive sampling frames but concatenated originally in the same RTP packet (the RTP packet comprises several data samples for an identical piece of "timestamp" information). In the case of the transport of channels in AC-3 audio format, according to the description of FIG. 5, the header 560 is common to a variety of AC-3 audio frames 553. Thus, the field 620 embeds an indication (not shown) of the number of successive frames (from 1 to the value of "NF" 563) providing for knowledge of the length of the list described here below, followed by a list of representation bytes of the channel indices with a dimension equal to the number of successive frames (these are the same type of bytes as in the previous embodiments, where each bit at 1 indicates the presence of the corresponding audio block). Then, the channels 611 are sent one after the other in order: for example frame 0/channel block 0, frame 0/channel block 1, frame 1/block 0 etc. There are therefore as many successive audio blocks as the sum of bits at 1 in the above-mentioned list of representation bytes of the field 620.

Figure 7:
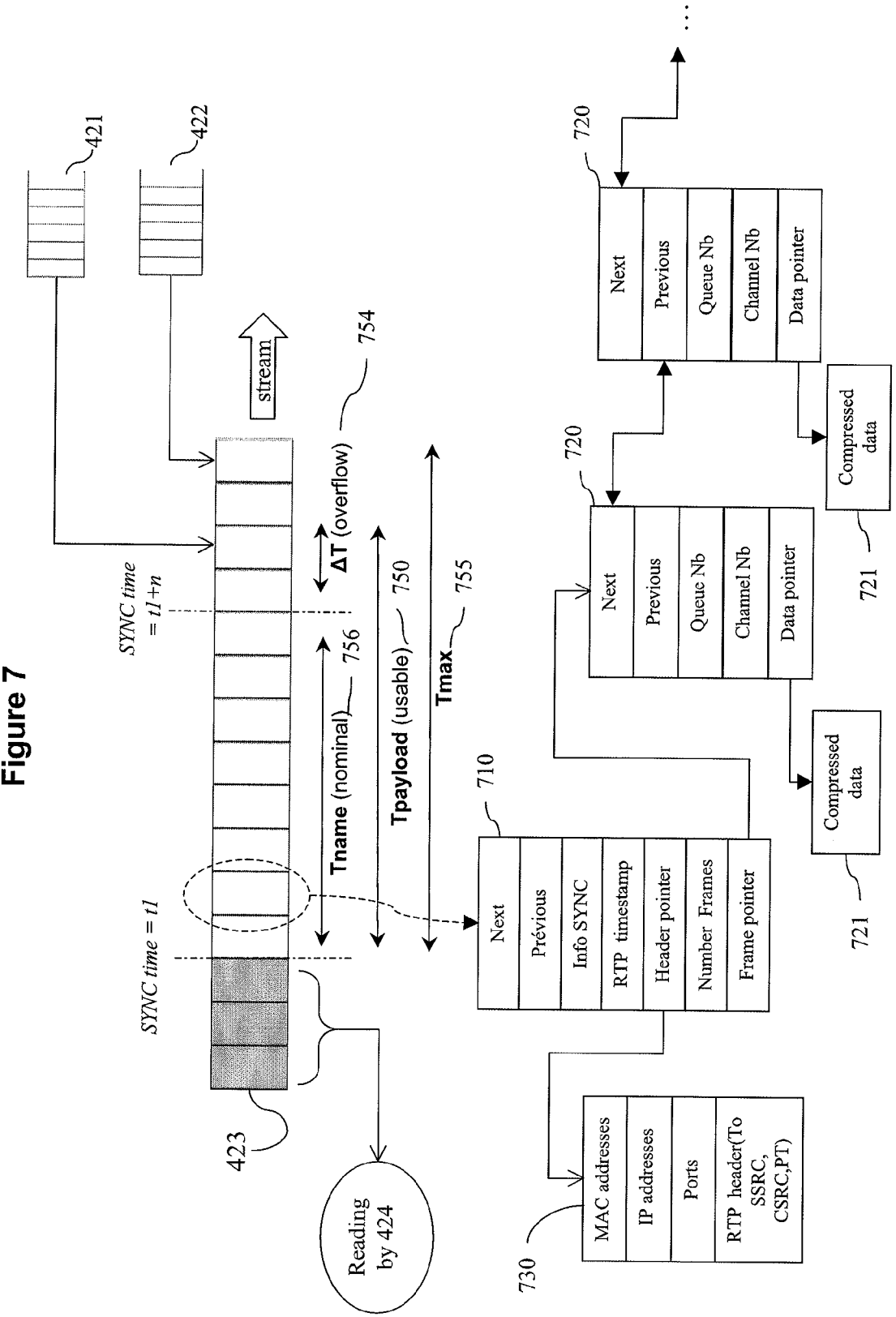
FIG. 7 is a schematic view illustrating a system for storage of data received from different carriers of the multi-protocol tunnel according to a particular embodiment of the invention.

FIG. 7 provides a schematic illustration of a temporary storage structure 423 in charge of ordering the data received coming from the multi-transport tunnel, it being known that these pieces of data are dynamically routed by the sender tunnel end-point device on independent carriers of the tunnel, and that each carrier has undergone losses on the Internet.

The storage 423 is represented here in the form of a stringed list of elements (also called nodes) 710, each element 710 representing a set of data frames 550 of the string 401, stamped by the same synchronization index SYNC 621 (i.e. data frames conveyed in the same RTP packet 401, and therefore subject to the same RTP timestamp information).

The element (or node) 710 comprises:
- pointers to the following and/or preceding elements (or nodes) 710 in order to form the stringed list 4323;
- information on synchronization SYNC 621 proper to transport on the tunnel, and enabling the elements (or nodes) 710 to be ordered relative to one another;

the RTP timestamp information corresponding to the synchronization SYNC information 621 (conveyed in the channel 611 representing the virtual channel CB0);

a pointer to a structure 730 that is common and permanent in the lifetime of the stream 401, grouping together the pieces of invariant data for the RTP protocol;

the number of applications frames (typically the number of frames 550 in the case of the AC-3 multi-channel stream transport) for a same time sample (conveyed in the block 620 of the header 610 according to FIG. 6);

a table of frames sized 1 having a length equal to the above-mentioned value of the number of frames, where each element points to a stringed and ordered list of channels 720 (the first element 720 of the list is preferably a virtual channel of the CB0 type and the following are data channels of an ABi type ordered by their index (or order number)).

The elements 730 saves the information on the stream 401 conveyed through the tunnel for a client and a server of each distinct LAN 103 and 104. The element 730 comprises especially the following information:

the MAC addresses of the client-server devices;
the IP addresses of the client-server devices;
the ports used for the RTP connection of each client and server device;
the RTP header information, common to all the RTP packets, comprising the current version of the RTP ("Ver") protocol, identification of the format of the data transported (payload type or PT) and the CSRC and SSRC identifiers of the RTP stream.

The channel element 720 comprises:

pointers to the following and/or preceding channel elements 720 in order to form a stringed list;
a reference "ChannelNB" indicating the channel index representing the current element (typically the index "i" of the block 553 ABi, or an index "−1" for a CB0 block which is the first index of the string);
a reference "QueueNB" used to identify the de-packeting unit 421 or 422 at the origin of the reception of the data element from the network, i.e. this amounts to knowing whether the data has been received by a reliable carrier (TCP 100A) or non-reliable carrier (UDP 100B) of the multi-transport tunnel;
a pointer to a memory storage zone 721 hosting the received piece of data.

Thus, upon the arrival of the data coming from the carriers 100-A or 100-B of the tunnel, the de-packeting units 421 or 422 are capable of inserting each piece of data received (the set 610-611) at the right position according to the following steps of:

searching for the element (or node) 710 according to the SYNC information 621 conveyed in the tunnel packet with creation of the element (or node) 710 if there is an absence (it will be noted here below that only the SYNC information 621 is necessary for the creation of an element (or node) 710 and that this value is present in all the packets of the tunnel. Whatever the order of arrival of the TCP or UDP packets, it is always possible to create an element (or node) 710 as soon as the first packet has arrived and it is then possible, with the following data or packets, to enrich it); then
searching from the block 620 of the tunnel packet for the corresponding applications frame 550 in the table of the frames of 710, and
inserting the channel sample 611 in the memory zone corresponding to the right index of the channel among the elements 720 (CB0 or ABi).

Thus, the frame refresh unit 424 is capable of easily obtaining, from the storage 423, the data needed to rebuild a data frame for each node 710.

For example, according to the illustration of FIG. 4, three node elements 710 are available (before the data "T") for extraction and sending to the local network. On the basis of the links between 710 and each of the element 720, the system 424 can propose a data frame (for example an AC-3 audio frame 553 with its header 560) to the stream sequence of 425 for encapsulation in an RTP packet and sending on the network.

The stream sequencer 425 is a classic unit and shall therefore not be the object of a detailed description.

According to the invention, the frame refresh unit 424 is capable of determining the behavior of the transmissions made through the carriers of the tunnel on the Internet in order to fill the temporary storage unit 423. For example, this determining is done regularly at each extraction of an element (or node) 710.

A nominal or reference value "Tname" (referenced 756) of the storage means 423 is typically 2 or 3 times the RTT between the modules 410 and 420, in order to enable at least one retransmission during a loss on the Internet (for the TCP carrier). From the number of data samples per second contained in the frames of the passenger stream 401 (for example 30 images/sec for a video) or from knowledge of the duration of a sample (for example 32 ms for an AC-3 audio frame according to a sampling frequency at 48 KHz, or 20 ms for audio conferencing), it is easy to know the number of elements 710 enabling the retransmission of the lost data on the Internet without interruption (or absence of data to be read) in the extraction of data from the storage means 423 by the module 424.

Quite particularly, the following information elements are extracted from the analysis of the filling of the storage means 423:

the useful filling of the storage means 423 with the value "Tpayload" (in terms of numbers of elements 710 having available a virtual channel element 720 called CB0 type) and referenced 750;
going beyond (or overflow of) the global filling "ΔT" (referenced 754) relative to the nominal value (in numbers of elements 710) and individual value for each TCP carrier 100A and UDP carrier 100B. The global overflow ΔT is the difference between the exploitable data ("Tpayload") present in the storage means 423 and the nominal value ("Tname"), the overflow of filling of the TCP carrier (ΔT_TCP) is the difference between the data present coming from the TCP carrier present in the storage means 423 and the nominal value ("Tname"), and the overflow of filling of the UDP carrier (ΔT_UDP) is the difference between the present data coming from the UDP carrier present in the storage means 423 and the nominal value ("Tname"). It can further be noted that the maximum number of elements 710 (denoted "Tmax", referenced 755) corresponds to the value "Tname" to which the greatest number of values between the overflow of filling of the TCP carrier (ΔT_TCP) and that of UDP carrier (ΔT_UDP) is added.
the rate of loss "Pi" for each of the channel elements 720 of the elements (or nodes) 710 included in the nominal filling zone.

The different possible cases of filling of the storage 423 will be examined here below with reference to FIG. 8 (the example of arrangement of the values 750, 754 and 755 of FIG. 7 would correspond to the cases Ⓐ or Ⓑ presented on FIG. 8).

The report sender 4242 is in charge of retrieving these values and of transmitting them on a return channel 430 to the module 410 so that this module can, using the decision engine 412, implement its algorithm for routing (or switching) the "data" channels on the carriers of the tunnel. Thus, the routing (or switching) of the applications channels according to the invention is linked in a control loop with the difficulties encountered and/or anticipated by the tunnel end-point (such as the module 420) which is the intended recipient of the applications stream 401.

The algorithm implemented by this report sender 4242 is described in greater detail here below with reference to FIG. 8.

The information return channel 430 can be formed without distinction:
- through a new dedicated carrier of the tunnel in the direction going from the module 420 to the module 410; or
- through the use of the return channel of a two-way carrier of the tunnel already open for the transfer of data from the module 410 to the module 420 (for example the TCP carrier 100A); or
- by a control session for the tunnel according to the protocol of the tunnel (for example according to the L2TP protocol).

In order to maximize extensibility in the L2TP protocol, a method of uniform encoding of the control and data elements is proposed by this protocol and is called "Attribute Value Pair" (AVP). This AVP structure consists of an association between a type of attribute and the value of this attribute, which may be usable for the transmission of any information between the two tunnel end-points.

Thus, the diagram 650 of the FIG. 6b shows an example of AVP structure 650 according to L2TP protocol to send a list of statistics read for the filling of the storage 423 at the remote tunnel end-point.

The header 651 is classic and an attribute code must be chosen so that the destination tunnel end-point recognizes the type of structure sent.

In terms of payload data, it is possible to indicate the number of elements of statistics mentioned here above (number of entries) followed by the list of above-mentioned statistics.

According to one particular embodiment of the invention, this list is formed by the fill overflow values for the TCP carrier ($\Delta T\_TCP$), fill overflow values for the UDP carrier ($\Delta T\_UDP$) and the value 754 transmitted in the form of "comma-separated values" (CSV) according to the information technology format open in text mode. This format has never truly been the object of a formal specification but the RFC 4180 standard describes the most common form and sets up its MIME "text/csv" type, registered with the IANA.

It could also equally well be replaced by an XML format for the requirements of the particular embodiment or any format adapted to the description of lists.

Once an element (or node) 710 has been used for the frame refresh unit 424, this element (or node) is eliminated from the storage 423. The following element (or node) 710 will be the next one taken charge of for the subsequent part of the transmission of the stream 402.

Figure 8:
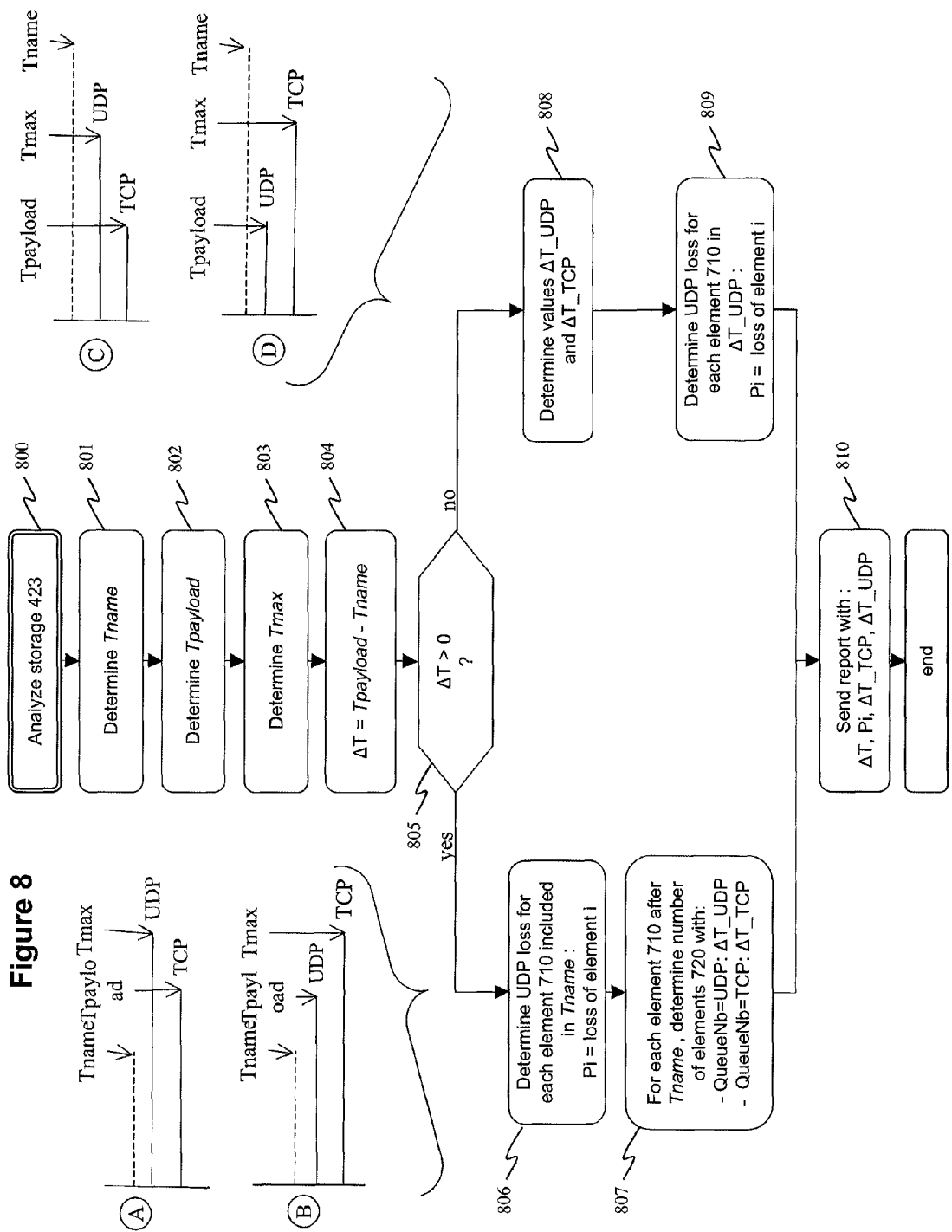
FIG. 8 is a schematic view illustrating a building algorithm for the building, by the tunnel end-point, of a loop report in a particular embodiment of the invention.

FIG. 8 provides a schematic illustration of an algorithm of the invention implemented in the report sender 4242 of the tunnel end-point 102 for the sending of the reception report 650 to the information channel 430, intended for the tunnel end-point 101.

The report sender 4242 of the tunnel end-point 102 is regularly activated in a step 800 for analysis of the filling of the storage means 423 and for obtaining information data elements to be reported to the decision engine 412 of the remote tunnel end-point.

A step 801 consists of the recomputation of the value "Tname" owing to the fluctuation of the mean RTT.

A step 802 consists in determining the number of exploitable data elements (denoted "Tpayload") in the storage means 423, i.e. the number of elements 710 having available both elements 720 corresponding to channels transmitted through the TCP carrier including the element "CB0" (with QueueNB="TCP") and elements 720 corresponding to channels transmitted through the UDP carrier (with QueueNB="UDP").

A following step 803 consists in determining the maximum number of elements 710 (denoted "Tmax" and referenced 755) contained in the storage means 423. It will be noted that "Tmax" may theoretically be equal to "Tpayload" if there is no de-sequencing between the TCP and UDP carriers, but this case is rare.

A step 804 consists in computing the difference $\Delta T$ between the exploitable data ("Tpayload") present in the storage means 423 and the nominal value ("Tname").

In a step 805, if there is a sufficient number of exploitable data elements (with the test of the step 805 being positive), steps 806 and 807 are executed. This corresponds to the two cases of filling of the storage means 423 denoted Ⓐ and Ⓑ in FIG. 8.

In the step 806, an indication of losses read for the exploitable data is sought on the channels conveyed by the UDP carrier and included between the first element of the list and the element corresponding to the index "Tname". For example, a value of a rate of loss "Pi" on a number of samples equal to the value Tname corresponds to the percentage of loss (or absence) of the data channel 720 indexed "i". For example, for a AC-3 audio multi-channel stream, the value P5 (for the audio channel 5) would be 5% if the number of elements 710 in the time "Tname" were to be 100 and if there were 5 elements 720 corresponding to the index of the channel 5 (ChannelNb=5) missing among the 100 elements 710.

In step the 807, a search is made for the de-sequencing (by extrapolation of the difference between the two pieces of information filling overflow) between the elements conveyed by the TCP carrier 100A and UDP carrier 100B relative to the nominal value Tname respectively denoted $\Delta T\_TCP$ and $\Delta T\_UDP$.

If pieces of exploitable data are missing relative to the nominal instruction Tname (the test of the step 805 being negative), steps 808 and 809 are executed. This corresponds to the two cases denoted Ⓒ and Ⓓ in FIG. 8.

In the step 808, the differences $\Delta T\_TCP$ and $\Delta T\_UDP$ are computed for the cases Ⓒ and Ⓓ. Typically, the test consists in looking at the element (or node) 710 corresponding to Tmax (i.e. the last element of the stringed list): if this element contains a channel element CB0 (conveyed by TCP), then the invention is in the case Ⓓ and the following formula is applied:

$$\Delta T\_TCP = T\text{nom} - T\text{max}$$

$$\Delta T\_UDP = T\text{name} - T\text{payload}$$

If not, we are in the case Ⓒ and the following formula are applied:

$$\Delta T\_TCP = T\text{name} - T\text{payload}$$

$$\Delta T\_UDP = T\text{name} - T\text{max}$$

The step 809 is identical to the step 806 except that the search terminals are different (i.e. between 1 and Tpayload (case ⒟) or between 1 and Tmax (case ⒞)).

And then in a step 810, the report sender 4242 is capable of sending a report on filling (or occupancy) of the storage 423 towards the remote tunnel end-point 101.

Figure 9:
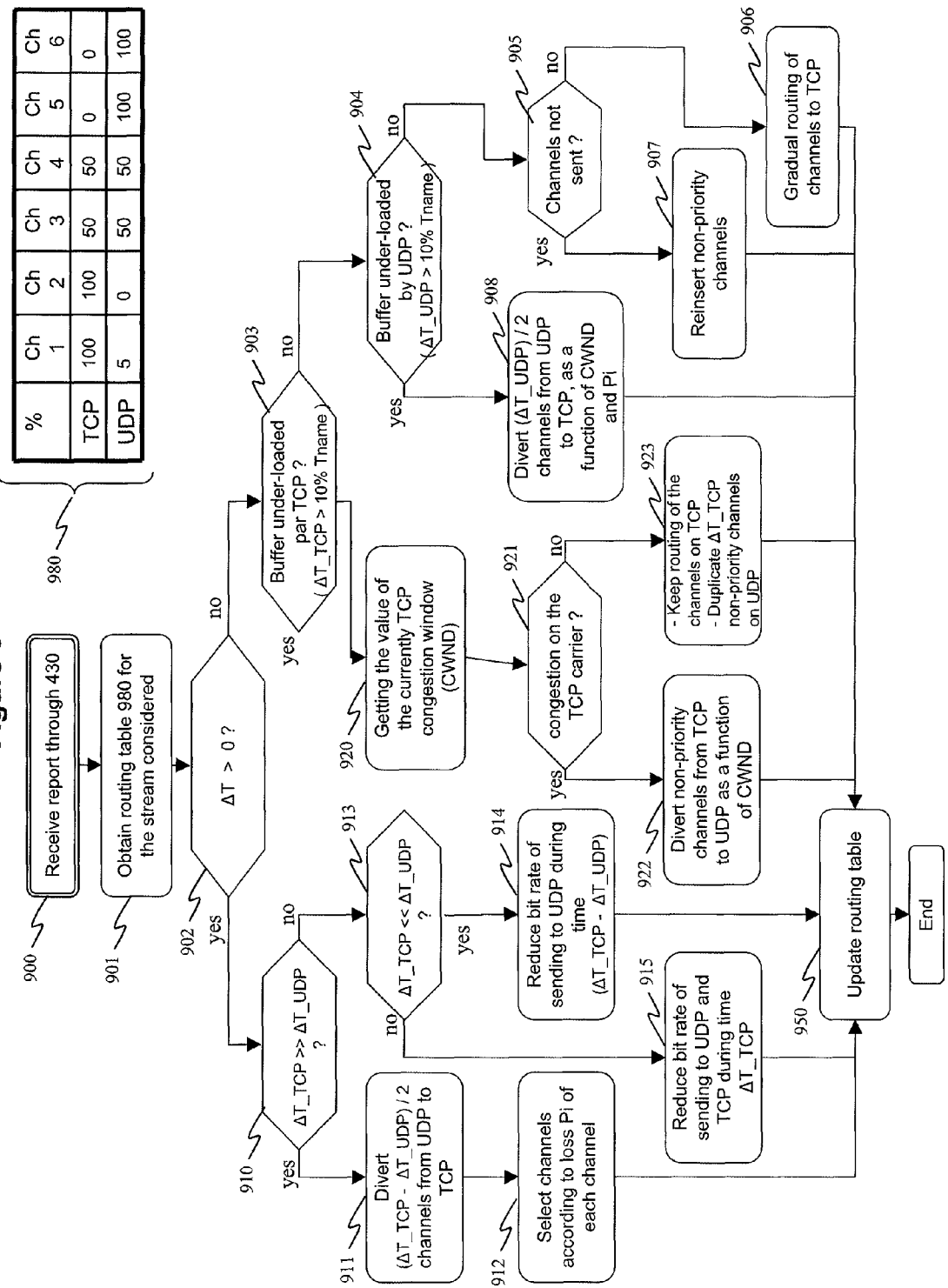
FIG. 9 is a schematic view illustrating an algorithm of implementation, by a decision engine, for the channels of a multi-channel stream 401.

FIG. 9 is a schematic illustration of an algorithm implemented by the routing decision engine 412 of the tunnel end-point 101 for the channels of a multi-channel stream 401.

A first step 900 is activated at the reception of a new information report 650 sent from the report sender 4242 of the remote tunnel end-point 102 through the information channel 430.

According to a particular embodiment of the invention, a storage of the previous report is done so as not to apply numerous corrective measures for a phenomenon that has already been reported beforehand.

Figure 10:
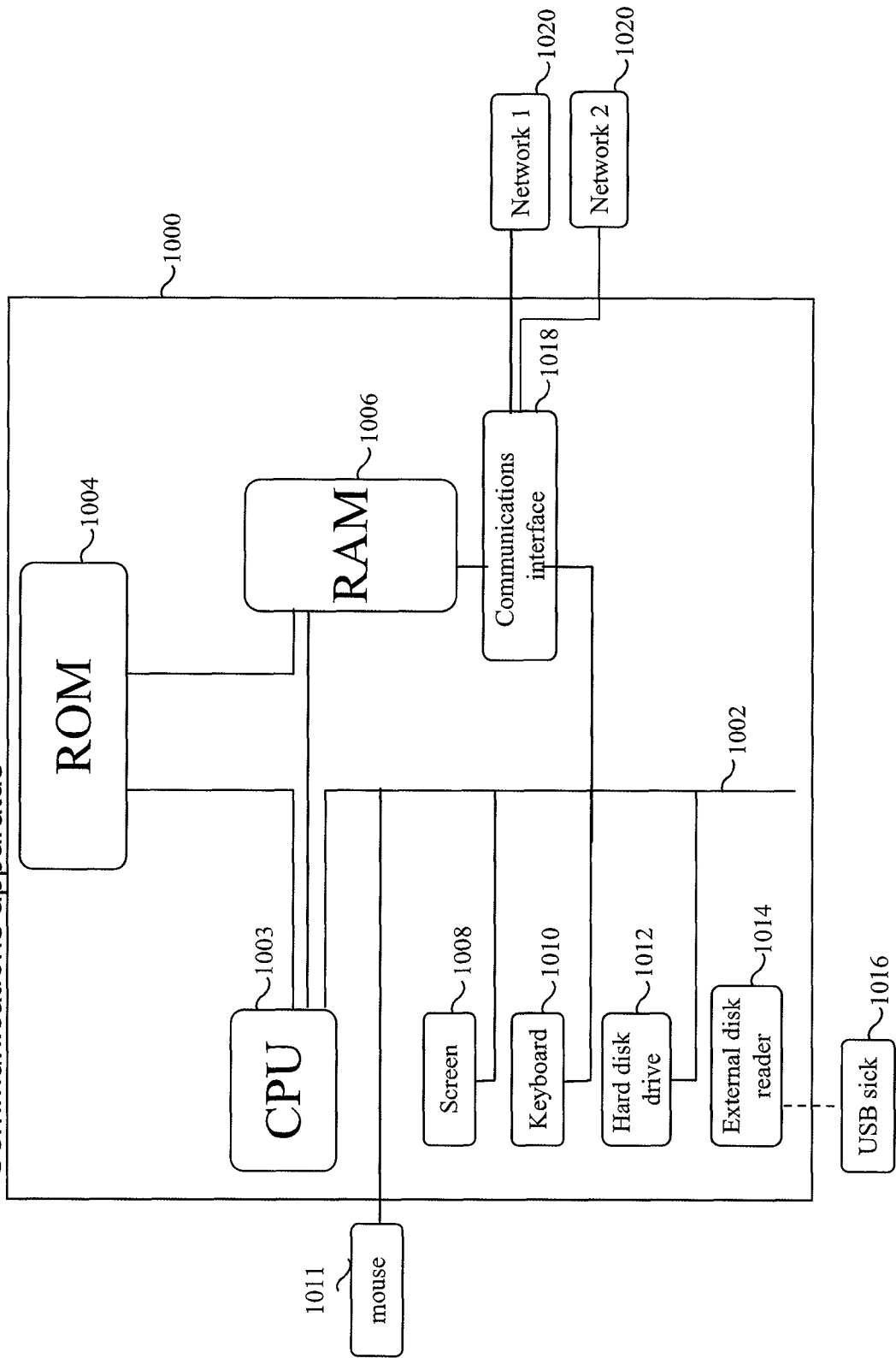
FIG. 10 is a schematic view illustrating a device according to a particular embodiment of the invention.

In a step 901, the routing table pertaining to the multi-channel stream 401 is obtained from a local read-only memory at the tunnel end-point 101 (described in more ample detail with reference to FIG. 10).

A default table may be associated for each type of format conveyed in the stream 401. For example, if the multi-channel multimedia content is in the AC-3 audio format, the routing table may be the table 980 of FIG. 9. This table indicates a distribution in percentage of each of the 6 data channels 553 (previously identified as "ABi" for the example of the AC-3 stream of FIG. 5) on either one of the carriers of the tunnel (TCP 100A or UDP 100B).

If, for an audio channel, there is a non-zero value of distribution for each carrier, it means that the data of this audio channel is distributed on the two carriers (or even transmitted as a duplicate if the sum of the values is greater than 100%, as is the case for example for the first channel "Ch1" of the table 980). According to one particular embodiment of the invention, the table 980 has an associated behavior for the distribution of the data on the two carriers (for example a channel having 50/50 may have an instructed value or set value of behavior of "one in two", i.e. that one piece of data in two is transmitted on TCP and the other on UDP).

The "virtual" data channels, denoted "CB0", are always transmitted at least on the TCP carrier.

A step 902 is used to make a check to see if the storage information 423 has not received a number of exploitable data samples (the information ΔT 754 is positive) greater than the nominal filling of this storage means 423.

If the storage means 423 has received a number of exploitable data samples (with the information ΔT 754 being positive) greater than the nominal filling rate, the set of steps 910 to 915 is executed.

If there are too many data elements received for the elements transmitted on the TCP carrier (with the test 910 being positive, i.e. ΔT_TCP is appreciably greater than ΔT_UDP (for example 20% greater), corresponding to the case ⒝ of FIG. 8), then a step 911 is used to compute the number of channel data elements to be transferred from the UDP carrier to the TCP carrier. This makes it possible to obtain the benefit of a TCP carrier presently having high performance characteristics (with few retransmissions) so that additional ABi data channels are added to it. The invention also reduces the average number of samples of frames 550 but these samples are more complete (i.e. they contain more channel elements 553). Thus, in deciding for example to take only half of the difference of the number of samples between TCP and UDP:

$$t = (\Delta T\_TCP - \Delta T\_UDP)/2$$

And in obtaining knowledge, through the present routing (or switching) table of the number N of channels for the conveyance through the UDP (N is the pro rata value of channels transmitted on UDP for a frame 550), we obtain a number of channels C (C=t*N) to be diverted from the UDP carrier to the TCP carrier.

In a step 912, the number of channels C to B diverted from the carrier UDP to the carrier TCP is selected. Any selection algorithm can be envisaged (involving the uniform distribution among channels or priority selection of the most important channels). For example, for the AC-3 audio format, in one "home cinema" type application, the stereo channels will be preferred to the rear channels. Preferably, the channels selected will be the channels based on the "Pi" loss information received (in general, these are channels with the greatest loss).

The routing (or switching) table is then updated in a step 950.

If the test of the step 910 is negative, then a step 913 is used to test for excessive data received for the elements transmitted on the UDP carrier (i.e. ΔT_UDP is appreciably greater than ΔT_TCP (for example 20% greater), corresponding to the case ⒜ of FIG. 8).

If this is the case, a step 914 is used to reduce the sending of data on the UDP carrier in order to allow time for the data sent on the carrier TCP to reach the destination tunnel end-point.

If the test of the step 913 is negative, this corresponds to an excessively fast operation of sending on the two carriers at the same time, bringing the storage means 423 to saturation. Then, in a step 915, the total sending bit rate is reduced so as not to congest the storage means 423.

In both cases, the routing table is then updated in a step 950.

If the storage means 423 is not over-occupied (the test of the step 902 is negative), a check is made (test 903) to see if the storage means 423 is not under-occupied: i.e. if there are not far too many data elements missing (for example the exploitable data elements fill less than 90% of the storage means 423).

If the storage means 423 is under-occupied (i.e. the test of the step 903 is positive), then a set of steps 920 to 923 is executed in order to know the causes of this under-occupation.

In a step 920, the transmission capacities of the TCP carrier are obtained by obtaining the value of the congestion window commonly called CWND (size of the sending memory in bytes) and a statistic on the status of the TCP connection (typically according to the TCP standard, in a "slow-start" period indicating a start or resumption after congestion of the connection, or according to the "congestion avoidance" mode in normal lossless operation.

A step 921 is used to determine whether there is congestion on the TCP carrier (for example by analysis of the re-transmissions made on the TCP carrier).

If congestion takes place on TCP (step 921), a step 922 diverts the channels 553 of the TCP carrier to the UDP carrier. On the basis of the available sending capacity according to the piece of information on CWND and the individual size of each element 553, the maximum number of elements 553 that can be sent is known. According to the same criteria of importance of the channels of the application streams as those cited in the step 912, the channels to be sent on the UDP carrier (hence to be sent in non-reliable mode) are chosen. Since the setting up of the TCP connection on the WAN section takes time (as a function of the RTT between the two remote networks), the routing (or switching) table 980 can here too be updated because the situation is lasting.

If the rate of loss Pi is great (above a predetermined threshold), it may become necessary to no longer convey some of the channels on the tunnel (for example the lower priority channels 5 or 6 whose routing table would indicate 0% for TCP and 60% for UDP: it is chosen to lose 40% of the data of these channels 553).

If there is no congestion on the TCP carrier, the step 923 will consist in preserving the default routing of the channels on TCP and in duplicating certain of these channels (a selection identical to the step 922) on the UDP carrier. For, in principle, sending on the UDP carrier is faster and may make it possible to gradually compensate for the lack of data present in the storage means 423.

If the number of exploitable elements 710 is accurate (with proper filling of information coming from the TCP carrier according to the nominal filling desired) in the storage means 423 (test 903 negative), it means that the pieces of data conveyed by the TCP carrier are transmitted in a manner suited to the current transmission situation.

Then, a step 904 is used to make a check to find out if the data conveyed through the UDP carrier are also properly transmitted.

Thus, an under-loading of the UDP carrier (positive test at the step 904) reveals a rate of information greater than here above. This is why, in a step 908, an attempt is made within the limits of the possibilities of transport of the TCP carrier (i.e. its CWND window) to divert the channels most affected by losses (Pi information) on the TCP carrier.

If the test of the step 904 is negative, then this is a case pointing to efficient global transmission (on both carriers of the tunnel) and there is no need for corrective action on the routing table 980.

In this case, a step 905 is used to check on whether the channels 553 had preliminarily been omitted from the transmission to the remote tunnel end-point.

If this is the case, a step 907 gradually re-inserts these omitted channels on both carriers according to their degree of criticality (in principle, there is a majority only of non-priority applications channels which have not been transmitted and hence the re-insertion is done on the UDP carrier).

If not, in a step 906, channels are gradually diverted from the UDP carrier to the TCP carrier in order to achieve the maximum loading of the TCP carrier which provides for a reliable transport of the data, and does so until a subsequent report provides warning of a possible overloading of the TCP carrier.

FIG. 10 schematically illustrates a device according to a particular embodiment of the invention.

An apparatus implementing the invention is for example a generic communications device 1000.

For example, the tunnel end-point 101 or 102 mentioned here above with reference to FIG. 1 is identical to the generic device 1000.

This generic device 1000 may be connected in particular to any means for the storage of images, videos or sound connected to a graphic card and delivering multimedia data to the generic device 1000.

Thus, the generic device 1000 has a communications bus 1002 to which the following are connected:
- a central processing unit 1003 (for example a microprocessor referenced CPU or central processing unit);
- a read-only memory 1004 referenced ROM that could comprise the above-mentioned software program or programs and is referenced Prog;
- a random-access memory 1006 (cache memory referenced RAM) comprising registers suited to recording variables and parameters created and modified in the course of execution by the above-mentioned software program or programs;
- a communications interface 1018 linked to at least two communications networks 1020, for example the local network 103/104 and the Internet 107, the interface being capable of transmitting and receiving data with these networks.

The generic device 1000 also has the following (but this is optional):
- a screen 1008 used to view the data and/or serve as a graphic user interface with the network administrator which could interact with the programs according to the invention using a keyboard 1010 or any other means such as a pointing device, for example a mouse 1011 or an optical pen or light pen;
- a hard disk drive 1012 capable of comprising the program or programs "Prog";

The communications bus 1002 enables communications and interoperability between the different means included in the generic device 1000 or connected to this device.

More generally, through the communications bus 1002, the central processing unit 1003 can communicate instructions to any device included in the generic device 1000 directly or by means of another device of the generic device 1000.

The executable code of each of the software programs mentioned here above enabling the generic device 1000 to implement the method can be stored for example in the hard disk drive 1012 or in the read-only memory 1004.

The central processing unit 1003 controls and directs the execution of the instructions or portions of executable code of the program or programs according to the invention. When the equipment is powered on, the program or programs which are stored in a non-volatile memory (for example the hard disk drive 1012 or the read-only memory 1004) are transferred to the random-access memory 1006, which will then contain the executable code of the software program or programs of the invention, as well as registers to memorize the variables and parameters needed to implement the methods according to the invention.

It should be noted that the communications apparatus comprising the device according to the invention can also be a programmed apparatus. This apparatus then contains the code of the computer program or programs, for example hard-wired into an applications-specific integrated circuit (ASIC).

It should be noted that the invention is not limited to a purely hardware implantation but that it can also be implemented in the form of a sequence of instructions of a computer program or any other form combining a hardware part and a software part. Should the invention be implanted partially or totally in software form, the corresponding sequence of instructions could be stored in a detachable storage means (such as for example a floppy, a CD-ROM or a DVD-ROM) or in a non-detachable storage means, this storage means being partially or totally readable by a computer or a microprocessor.

The invention claimed is:

1. A method of transmitting a multi-channel data stream comprising frames comprising a plurality of channels, the transmitting being done via a multitransport tunnel from a first tunnel end-point to a second tunnel end-point, said multitransport tunnel implementing a first carrier, and a second carrier wherein the first tunnel end-point performs steps, for a given frame of said multichannel data stream, of:
   receiving the multi-channel data stream input to the first tunnel end-point;

obtaining, from the second tunnel end-point, at least one piece of information on quantity of data of said multi-channel data stream received by the second tunnel end-point;
obtaining at least one piece of information on congestion of the first carrier;
deciding, using the obtained at least one piece of information on the quantity of data and the obtained at least one piece of information on congestion, which channels of the given frame of said multi-channel data stream are to be routed to the first carrier of the multitransport tunnel and which channels of the given frame are to be routed to the second carrier of the multi-transport tunnel;
routing the channels of the given frame of said multi-channel data stream decided by the deciding step to the first and second carriers of the multi-transport tunnel;
supplying one piece of synchronization information with said plurality of channels; and
transmitting to the second tunnel end-point each of the plurality of channels of said given frame via the decided carrier to which said channel has been routed, as well as its supplied piece of synchronization information, wherein said first carrier supports a transport protocol with acknowledgement and said second carrier supports a transport protocol without acknowledgement.

2. The method according to claim 1, wherein the piece of synchronization information supplied with a channel is a piece of time-stamp information extracted from said multi-channel data stream.

3. The method according to claim 1, wherein said piece of information on quantity of data of said multi-channel data stream received by the second tunnel end-point includes at least one of: information on a filling of a reception buffer included in said second tunnel endpoint; and information on a data loss rate of said stream transmitted on said second carrier.

4. The method according to claim 3, wherein the piece of information on a filling of a reception buffer includes at least one of: a first piece of information on difference between an instantaneous filling value and a reference filling value, the filling referring to a part of said reception buffer for receiving data from the first carrier;
a second piece of information on difference between an instantaneous filling value and a reference filling value, the filling referring to a part of said reception buffer for receiving data from the second carrier; and a third piece of information on difference between a number of pieces of payload data of said multi-channel data stream and a reference filling value, a piece of payload data being a frame having available channels present in a part of said reception buffer for receiving data from the first carrier as well as channels present in a part of said reception buffer for receiving data from the second carrier.

5. The method according to claim 4, further comprising at least one of the following steps:
routing to the first carrier of a number of channels of a current frame greater than a number of channels of a previous frame routed to said first carrier, if the third piece of information on difference is positive and if the first piece of information on difference is greater by at least one first predetermined divergence than the second piece of information on difference;
routing certain channels of a current frame to none of said first and second carriers, if the third piece of information on difference is positive and if the first piece of information on difference is not greater by at least said first predetermined divergence than the second piece of information on distance;
routing a number of channels of a current frame to the first carrier, this number being smaller than a number of channels of a previous frame routed to said first carrier, if the third piece of information on difference is negative, if the first piece of information on difference is greater than a predefined portion of said reference value and if a congestion of the first carrier is detected;
routing channels of a current frame, which were routed for a previous frame solely to said first carrier, to the first and second carriers, if the third piece of information on difference is negative, if the first piece of information on difference is greater than a predefined portion of said reference value and if no congestion of the first carrier is detected; and
routing a number of channels of a current frame to the first carrier that is greater than a number of channels of a previous frame routed to said first carriers if the third piece of information on difference is negative and if the second piece of information on difference is greater than a predefined portion of said reference value.

6. The method according to claim 1, wherein the first tunnel end-point further performs a step of: associating a piece of priority information with each of the channels as a function of a predetermined profile of an application conveyed by said stream, wherein in said deciding step, the decision of the first and second carriers is also performed as a function of pieces of priority information associated with the channels.

7. A non-transitory computer-readable storage medium storing a set of instructions that can be executed by a computer to implement a method of transmitting a multi-channel data stream comprising frames comprising a plurality of channels, the transmitting being done via a multi-transport tunnel from a first tunnel end-point to a second tunnel end-point, said multi-transport tunnel implementing a first carrier and a second carrier, wherein according to the stored set of instructions the first tunnel end-point performs steps, for a given frame of said stream, of:
receiving the multi-channel data stream input to the first tunnel end-point;
obtaining, from the second tunnel end-point, at least one piece of information on quantities of data of said multi-channel data stream received by the second tunnel end-point;
obtaining at least one piece of information on congestion of the first carrier; deciding, using the obtained at least one piece of information on the quantity of data and the obtained at least one piece of information on congestion, which channels of the given frame of said multi-channel data stream are to be routed to the first carrier of the multitransport tunnel and which channels of the given frame are to be routed to the second carrier of the multi-transport tunnel;
routing the channels of the given frame of said multi-channel data stream decided by the deciding step to the first and second carriers of the multi-transport tunnel;
supplying one piece of synchronization information with said channels; and
transmitting to the second tunnel end-point each of the channels of said given frame via the decided carrier to which said channel has been routed, as well as their associated piece of synchronization information, wherein said first carrier supports a transport protocol with acknowledgement and said second carrier supports a transport protocol without acknowledgement.

8. A first tunnel end-point participating in a transmission of a multi-channel data stream comprising frames comprising a plurality of channels, the transmission being done via a multi-transport tunnel from a first tunnel end-point to a second tunnel end-point, said tunnel implementing a first carrier and a second carrier, wherein said first tunnel end-point comprises:

receiving means that receives the multi-channel data stream input to the first tunnel end-point;

first obtaining means for obtaining, from the second tunnel end-point, at least one piece of information on quantities of data of said multi-channel data stream received by the second tunnel end-point;

second obtaining means for obtaining at least one piece of information on congestion of the first carrier;

deciding means for deciding, using the obtained at least one piece of information on the quantity of data and the obtained at least one piece of information on congestion, which channels of the given frame of said multi-channel data stream are to be routed to the first carrier of the multi-transport tunnel and which channels of the given frame are to be routed to the second carrier of the multi-transport tunnel;

routing means for routing said channels of a frame of said multi-channel data stream decided by the deciding means to the first and second carriers of the tunnel;

supplying means for supplying one piece of synchronization information with said channels; and transmitting means for transmitting to the second tunnel end-point each of the channels of said given frame via the decided carrier to which said channel has been routed, as well as its supplied piece of synchronization information, wherein said first carrier supports a transport protocol with acknowledgement and said second carrier supports a transport protocol without acknowledgement.

9. The first tunnel end-point according to claim 8, wherein the piece of synchronization information supplied with a channel is a piece of timestamp information extracted from said multi-channel data stream.

10. The first tunnel end-point according to claim 8, wherein said piece of information on quantity of data of said multi-channel data stream received by the second tunnel end-point includes at least one of:

information on a filling of a reception buffer included in said second tunnel endpoint; and information on a data loss rate of said stream transmitted on said second carrier.

11. The first tunnel end-point according to claim 10, wherein the piece of information on a filling of a reception buffer includes at least one of:

a first piece of information on difference between an instantaneous filling value and a reference filling value, the filling referring to a part of said reception buffer for receiving data from the first carrier;

a second piece of information on difference between an instantaneous filling value and a reference filling value, the filling referring to a part of said reception buffer for receiving data from the second carrier; and a third piece of information on difference between a number of pieces of payload data of said multi-channel data stream and a reference filling value, a piece of payload data being a frame having available channels present in a part of said reception buffer for receiving data from the first carrier as well as channels present in a part of said reception buffer for receiving data from the second carrier.

12. The first tunnel end-point according to claim 8, further comprising associating means for associating a piece of priority information with each of the channels as a function of a predetermined profile of an application conveyed by said stream, wherein in said deciding means, the decision of the first and second carriers is also performed as a function of pieces of priority information associated with the channels.

13. A method of transmitting a multi-channel data stream, wherein the multi-channel data stream comprises a plurality of channels and wherein the transmitting is done via a multi-transport tunnel from a first tunnel end-point to a second tunnel end-point, and wherein the multi-transport tunnel implements a first carrier and a second carrier wherein for a given frame of the multi-channel data stream, the method comprises the first tunnel end-point performing steps which include:

receiving the multi-channel data stream input to the first tunnel end-point;

obtaining, from the second tunnel end-point, at least one piece of information on quantity of data of the multi-channel data stream received by the second tunnel end-point;

obtaining at least one piece of information on congestion of the first carrier;

deciding, using the obtained at least one piece of information on the quantity of data and the obtained at least one piece of information on congestion, which channels of the given frame of said multi-channel data stream are to be routed to the first carrier of the multitransport tunnel and which channels of the given frame are to be routed to the second carrier of the multi-transport tunnel;

routing the channels of the given frame of the multi-channel data stream decided by the deciding step to the first carrier having acknowledgment and the second carrier not having acknowledgment;

supplying one piece of synchronization information with the plurality of channels;

and transmitting to the second tunnel end-point each of the plurality of channels of the given frame via the decided carrier to which the channel has been routed, together with transmission of the supplied piece of synchronization information, wherein said first carrier supports a transport protocol with acknowledgement and said second carrier supports a transport protocol without acknowledgement.

* * * * *